(12) United States Patent
Kato et al.

(10) Patent No.: US 10,686,339 B2
(45) Date of Patent: Jun. 16, 2020

(54) LAMINATED CORE AND METHOD FOR MANUFACTURING THE SAME

(71) Applicant: Mitsui High-tec, Inc., Yahatanishi-ku, Kitakyushu-shi, Fukuoka (JP)

(72) Inventors: Go Kato, Kitakyushu (JP); Yasutaka Oba, Kitakyushu (JP)

(73) Assignee: Mitsui High-tec, Inc., Kitakyushu-Shi, Fukuoka (JP)

( * ) Notice: Subject to any disclaimer, the term of this patent is extended or adjusted under 35 U.S.C. 154(b) by 356 days.

(21) Appl. No.: 15/640,188

(22) Filed: Jun. 30, 2017

(65) Prior Publication Data

US 2018/0006509 A1 Jan. 4, 2018

(30) Foreign Application Priority Data

Jul. 1, 2016 (JP) .................................. 2016-131777

(51) Int. Cl.
  *H02K 1/06* (2006.01)
  *H02K 15/02* (2006.01)

(52) U.S. Cl.
  CPC ............... *H02K 1/06* (2013.01); *H02K 15/02* (2013.01); *H02K 2201/00* (2013.01)

(58) Field of Classification Search
  CPC ....... H02K 1/06; H02K 15/02; H02K 2201/00
  USPC .................................................. 310/216.055
  See application file for complete search history.

(56) References Cited

U.S. PATENT DOCUMENTS

| 4,524,507 A * | 6/1985 | Hara ...................... B21D 28/22 |
| | | 29/33 Q |
| 5,799,387 A * | 9/1998 | Neuenschwander .. B21D 28/02 |
| | | 29/598 |
| 6,018,207 A * | 1/2000 | Saban .................. H02K 15/024 |
| | | 29/738 |
| 8,916,254 B2 * | 12/2014 | Nagai ...................... H02K 1/16 |
| | | 310/216.004 |
| 2012/0058313 A1 * | 3/2012 | Nagai ...................... H02K 1/16 |
| | | 428/195.1 |

FOREIGN PATENT DOCUMENTS

| CN | 102428627 A | 4/2012 |
| DE | 102009034791 A1 | 1/2011 |
| JP | H07231588 A | 8/1995 |
| JP | 2007221907 A | 8/2007 |
| JP | 2011-010389 A | 1/2011 |
| JP | 2015-097466 A | 5/2015 |
| KR | 1020080092360 A | 10/2008 |
| WO | 8203491 A1 | 10/1982 |

* cited by examiner

*Primary Examiner* — Forrest M Phillips
(74) *Attorney, Agent, or Firm* — Procopio, Cory, Hargreaves & Savitch LLP

(57) ABSTRACT

A laminated core includes: a laminate in which $1^{st}$ to $N^{th}$ (N is a natural number of two or more) core members are laminated in this order; and a distinguishing mark formed with a marking that is placed on a peripheral surface of the laminate so as to be continuously positioned over all of the $1^{st}$ to $N^{th}$ core members.

11 Claims, 17 Drawing Sheets

LAMINATED CORE AND METHOD FOR MANUFACTURING THE SAME

CROSS-REFERENCE TO RELATED APPLICATIONS

This application is based upon and claims the benefit of priority from Japanese Patent Application No. 2016-131777, filed Jul. 1, 2016, the entire contents of which are incorporated herein by reference.

BACKGROUND

Field

The present disclosure relates to a laminated core and a method for manufacturing the same.

Japanese Unexamined Patent Publication No. 2015-097466 discloses a method for manufacturing a laminated core. The method includes a laminating step of laminating, one on another, a plurality of blanked members that are blanked from a metal sheet (e.g., an electrical steel sheet) to obtain a laminate and an integrating step of integrating the blanked members thus laminated. At the integrating step, for example, a process of injecting resin into through holes that run through the blanked members in the laminating direction, a process of welding peripheral surfaces of the blanked members along the laminating direction, or other processes are performed. The manufacturing method disclosed in Japanese Unexamined Patent Publication No. 2015-097466 is also called "bulk stacking" because the blanked members are not coupled together by swaging, for example, when being laminated.

Japanese Unexamined Patent Publication No. 2011-010389 discloses a method for manufacturing a laminated core. The method includes a block-forming step of obtaining a block in which a predetermined number of blanked members are laminated, a laminating step of laminating a plurality of blocks to obtain a laminate, and an integrating step of integrating the blocks thus laminated. At the block-forming step, blanked members adjacent in the laminating direction are coupled to each other by swaging to form one block. At the integrating step, similarly to that in the manufacturing method of Japanese Unexamined Patent Publication No. 2015-097466, blocks are integrated together by a resin-injecting process or a welding process, for example. The manufacturing method disclosed in Japanese Unexamined Patent Publication No. 2011-010389 is also called "block stacking" because the laminated core is obtained by laminating the blocks.

SUMMARY

A laminated core according to one aspect of the present disclosure includes: a laminate in which to $1^{st}$ to $N^{th}$ (N is a natural number of two or more) core members are laminated in this order; and a distinguishing mark formed with a marking that is placed on a peripheral surface of the laminate so as to be continuously positioned over all of the $1^{st}$ to $N^{th}$ core members.

A method for manufacturing a laminated core according to another aspect of the present disclosure is a method for manufacturing the laminated core described above, and includes: a first step of laminating the $1^{st}$ to $N^{th}$ core members in this order to form the laminate; and a second step of placing a marking on the peripheral surface of the laminate to form the distinguishing mark.

DETAILED DESCRIPTION

Figure 1:
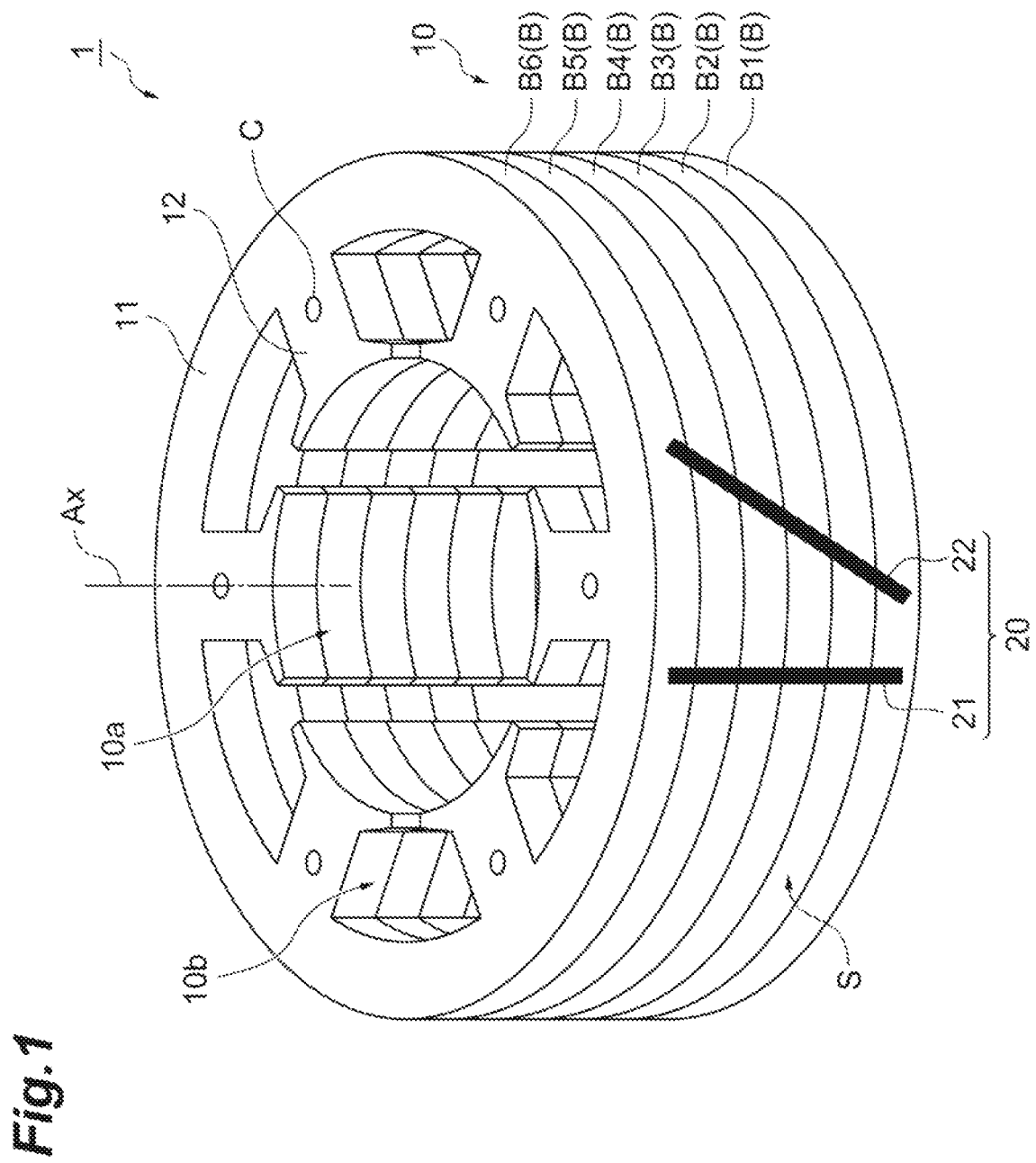
FIG. 1 is a perspective view illustrating one example of a laminated stator core.

Embodiments according to the present disclosure described below are examples for explaining the present invention, and thus the present invention is not limited to the description below.

Outline of Embodiment

<1> A laminated core according to one example of the present embodiment includes: a laminate in which $1^{st}$ to $N^{th}$ (N is a natural number of two or more) core members are laminated in this order; and a distinguishing mark formed with a marking that is placed on a peripheral surface of the laminate so as to be continuously positioned over all of the $1^{st}$ to $N^{th}$ core members.

In the laminated core according to the example of the present embodiment, the distinguishing mark is formed on the peripheral surface of the laminate, and this distinguishing mark is formed with the marking that is placed on the peripheral surface of the laminate so as to be continuously positioned over all of the $1^{st}$ to $N^{th}$ core members. Thus, when the core members constituting the laminate are rotationally displaced, the shape of the distinguishing mark formed on the peripheral surface of the laminate deforms from the original one or becomes discontinuous. Thus, the rotational displacement can be easily found based on the distinguishing mark, and the rotational displacement of the laminate can be solved by displacing the core members such that the shape of the distinguishing mark becomes the original shape. Consequently, the rotational displacement of the laminate can be prevented.

<2> In the laminated core described in the section <1>, the laminate may be formed by laminating the $1^{st}$ to $(N+1)^{th}$ core members in this order, the distinguishing mark may have a marking line including at least two or more portions extending in a laminating direction of the $1^{st}$ to $(N+1)^{th}$ core members, and the marking line may have two different intersections $Pn_1$ and $Pn_2$ at a boundary between the $n^{th}$ (n is a natural number of 1 to N) core member among the $1^{st}$ to $(N+1)^{th}$ core members and the $(n+1)^{th}$ core member among the $1^{st}$ to $(N+1)^{th}$ core members, and may satisfy, for all n, formula 1:

$$Ln \neq Lm \quad (1)$$

where Ln is a separation distance between intersections $Pn_1$ and $Pn_2$; and m is any natural number of 1 to N except n.

In this case, based on the separation distance Ln, the $1^{st}$ to $(N+1)^{th}$ core members are individually identified. Thus, after the laminate has been obtained, even if an abnormality in which the order of the core members is changed or the up/down orientation of the core members is changed has occurred, the abnormality can be easily found based on the distinguishing mark, and the abnormality of the laminate can be solved by, for example, stacking again the core members such that the shape of the distinguishing mark becomes the original shape.

<3> In the laminated core described in the section <1> or <2>, the distinguishing mark may have first and second marking lines extending in the laminating direction of the $1^{st}$ to $N^{th}$ core members.

<4> In the laminated core described in the section <3>, the laminate may be formed by laminating the $1^{st}$ to $(N+1)^{th}$ core members in this order, and may satisfy, for all n, formula 2:

$$Dn \neq Dm \quad (2)$$

where Dn is a separation distance between the first marking line and the second marking line at a boundary between the $n^{th}$ (n is a natural number of 1 to N) core member among the 1 to $(N+1)^{th}$ core members and the $(n+1)^{th}$ core member among the $1^{st}$ to $(N+1)^{th}$ core members; and m is any natural number of 1 to N except n.

In this case, based on the separation distance Dn, the $1^{st}$ to $(N+1)^{th}$ core members are individually identified. Thus, after the laminate has been obtained, even if an abnormality in which the order of the core members is changed or the up/down orientation of the core members is changed has occurred, the abnormality can be easily found based on the distinguishing mark, and the abnormality of the laminate can be solved by, for example, stacking again the core members such that the shape of the distinguishing mark becomes the original shape.

<5> In the laminated core described in any one of the sections <2> to <4>, the marking line may be asymmetrical with respect to an imaginary line extending through the center of the laminate in the laminating direction when viewed from the peripheral surface. In this case, based on the shape of the distinguishing mark, the $1^{st}$ core member side or the $N^{th}$ core member side of the laminate can be easily identified.

<6> In the laminated core described in the section <5>, the marking line may have portions that are positioned closer to each other from the $1^{st}$ core member toward the $N^{th}$ core member.

<7> In the laminated core described in the section <3> or <4>, the first and second marking lines may be asymmetrical with respect to an imaginary line extending through the center of the laminate in the laminating direction when viewed from the peripheral surface. In this case, based on the shape of the distinguishing mark, the $1^{st}$ core member side or the $N^{th}$ core member side of the laminate can be easily identified.

<8> In the laminated core described in the section <7>, the first marking line and the second marking line may be positioned closer to each other from the $1^{st}$ core member toward the $N^{th}$ core member. In this case, the first marking line and the second marking line come closest to or come into contact with each other at the $N^{th}$ core member. Thus, based on the shape of the distinguishing mark, the $1^{st}$ or $N^{th}$ core member positioned in an end in the laminating direction can be easily identified.

<9> In the laminated core described in the section <3>, <4>, <7> or <8>, the first marking line and the second marking line do not have to intersect.

<10> In the laminated core described in the section <3>, <4>, <7> or <8>, the first marking line and the second marking line may intersect <11> In the laminated core described in any one of the sections <1> to <10>, on the peripheral surface of the laminate, an irregularly shaped portion having a projecting shape or a recessed shape may be formed, and the distinguishing mark may be formed in a position corresponding to the irregularly shaped portion. In this case, based on the distinguishing mark on the peripheral surface of the laminate, where in the laminate the irregularly shaped portion is located can be easily identified.

<12= A manufacturing method for a laminated core according to another example of the present embodiment is a method for manufacturing the laminated core described in any one of the section <1> to <11>, and the method includes: a first step of laminating the $1^{st}$ to $N^{th}$ core members in this order to form the laminate; and a second step of placing a marking on the peripheral surface of the laminate to form the distinguishing mark.

In the manufacturing method for a laminated core according to the other example of the present embodiment, at the second step, the distinguishing mark is formed by placing the marking on the peripheral surface of the laminate. Thus, when the core members constituting the laminate are rotationally displaced, the shape of the distinguishing mark formed on the peripheral surface of the laminate deforms from the original one or becomes discontinuous. Thus, the rotational displacement can be easily found based on the distinguishing mark, and the rotational displacement of the laminate can be solved by displacing the core members such that the shape of the distinguishing mark becomes the original shape. Consequently, the rotational displacement of the laminate can be prevented.

<13> The method described in the section <12> may further include a third step of determining whether the distinguishing mark formed at the second step has been deformed after the second step.

<14> The method described in the section <13> above may further include a fourth step of determining quality of the laminate after the first step and before the second step, and when it has been determined at the fourth step that the laminate is non-defective, the distinguishing mark may be formed on the peripheral surface of the laminate at the second step. In this case, the distinguishing mark is formed on the non-defective laminate, and thus the quality of the laminate can be easily identified. Furthermore, even if an abnormality such as displacement occurs in the laminate, the laminate can be restored to a non-defective condition by displacing the core members such that the shape of the distinguishing mark becomes the original shape.

<15> In the method described in the section <14> above, at the fourth step, whether lamination height of the laminate is within a predetermined appropriate range may be determined, and when it has been determined at the fourth step that the lamination height is within the appropriate range, the distinguishing mark may be formed on the peripheral surface of the laminate at the second step. In this case, the laminate having an appropriate lamination height can be identified based on the distinguishing mark.

<16> In the method described in the section <15> above, the distinguishing mark may have first and second marking lines extending in the laminating direction of the $1^{st}$ to $N^{th}$ core members. The method described in the section <15> above may further include: a fifth step of placing a marking on the peripheral surface of the laminate to form the first marking line when it has been determined at the fourth step that the lamination height exceeds the appropriate range; a sixth step of adjusting the lamination height such that the lamination height is within the appropriate range after the fifth step; a seventh step of determining whether the lamination height adjusted at the sixth step is within the appropriate range; and an eighth step of placing a marking on the peripheral surface of the laminate to form the second marking line, thereby obtaining the distinguishing mark when it has been determined at the seventh step that the lamination height is within the appropriate range. In this case, at the fifth step, the first marking line is formed on the laminate having a lamination height exceeding the appropriate range. On a laminate having a lamination height that, after being adjusted at the sixth step, has been determined to be out of the appropriate range at the seventh step, the second marking line is not formed at the eighth step, and thus the first marking line exists on the peripheral surface of the laminate. In contrast, on a laminate having a lamination height that, after being adjusted at the sixth step, has been determined to be within the appropriate range, the second marking line is formed at the eighth step, and consequently a distinguishing mark that is similar to the distinguishing mark obtained at the second step is formed on the peripheral surface of the laminate. Thus, whether the laminate has a lamination height that has become appropriate because of adjustment of the lamination height can be identified by the fact that the first marking line exists on the peripheral surface of the laminate or the fact that the distinguishing mark (the first and second marking lines) exists on the peripheral surface of the laminate.

<17> In the method described in the section <16> above, the distinguishing mark obtained at the second step and the distinguishing mark obtained at the eighth step may be different in shape. The laminate on which the distinguishing mark has been placed at the second step is a laminate having a lamination height that is appropriate without adjustment of the lamination height. In contrast, the laminate on which the distinguishing mark has been placed at the eighth step is a laminate having a lamination height that has become appropriate because of adjustment of the lamination height. Thus, by making the shape of the distinguishing mark obtained at the second step different from that of the distinguishing mark obtained at the eighth step, whether the laminate has a lamination height that has been adjusted can be identified.

<18> The method described in any one of the sections <12> to <17> may further include a ninth step of, after the second step, placing a marking on the peripheral surface of the laminate to form another distinguishing mark that is different from the distinguishing mark. In this case, during a period after the second step and until the core members are integrated together, the laminated state of the laminate is adjusted, for example, and thus even if the shape of the distinguishing mark formed on the peripheral surface of the laminate has deformed from the original one, a new distinguishing mark is placed at the ninth step. Thus, rotational displacement can be easily found based on the new distinguishing mark, and the rotational displacement of the laminate can be solved by displacing the core members such that the shape of the new distinguishing mark becomes Me original shape. Consequently, the rotational displacement of the laminate can be prevented.

Exemplification of Embodiment

The following describes one example of the embodiment according to the present disclosure in detail with reference to the drawings. In the following description, same elements or elements having same functions are designated by same numerals, and duplicate explanation is omitted.

[Laminated Stator Core]

Figure 2:
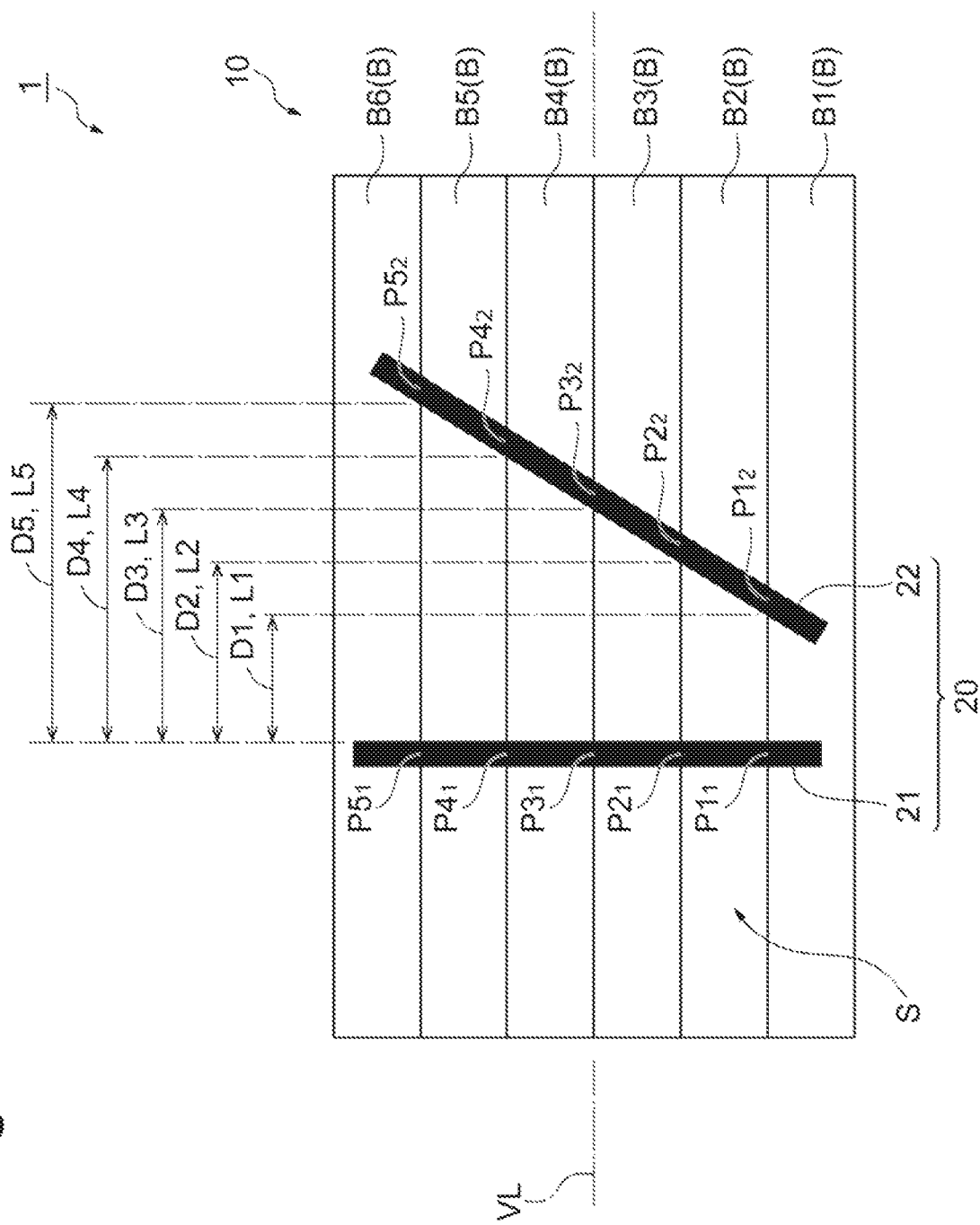
FIG. 2 is a side view of the laminated stator core in FIG. 1.
Figure 3:
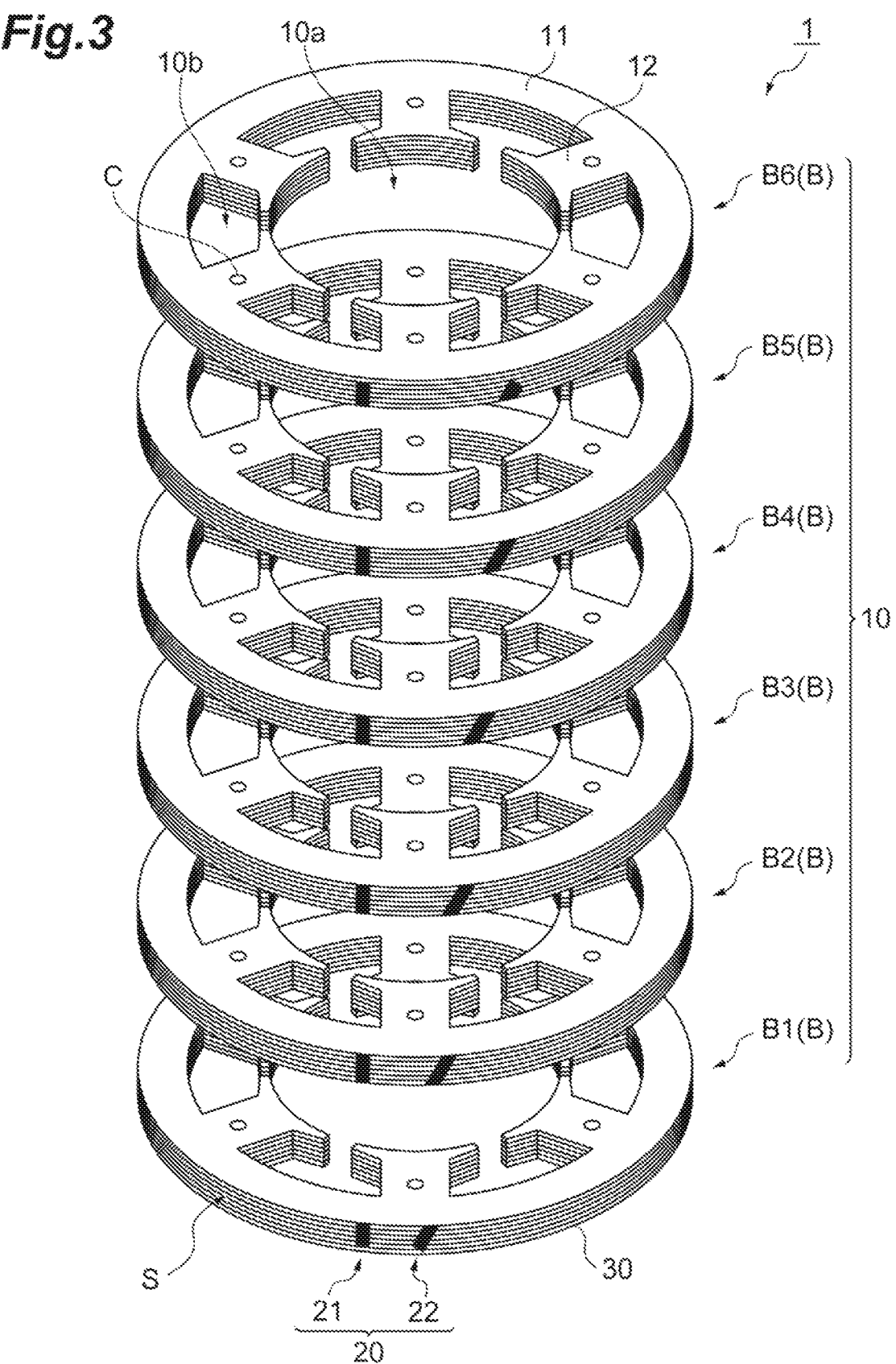
FIG. 3 is an exploded perspective view of the laminated stator core in FIG. 1.

Referring to FIG. 1 to FIG. 3, a configuration of a laminated stator core 1 will be described first. As depicted in FIG. 1, the laminated stator core 1 (stator) includes a laminate 10 and a distinguishing mark 20.

In the laminate 10, $1^{st}$ to $N^{th}$ (N is a natural number of two or more) blocks B (core members) are laminated in this order. In an example depicted in FIG. 1 to FIG. 3 (example of N=6), in the laminate 10, six blocks B1 to B6 are laminated in this order from the lower side toward the upper side. Blocks B adjacent in a laminating direction of the blocks B (hereinafter simply called "laminating direction") are joined together by welding, for example, (not depicted) to be integrated.

As depicted in FIG. 3, each block B is a laminate in which a plurality of blanked members 30 are stacked. Blanked members 30 adjacent in the laminating direction are fastened together by swaged areas C. Blocks B adjacent in the laminating direction are not fastened together by swaged areas C.

The laminate 10 may be formed by what is called rotational stack. The term "rotational stack" means, when a plurality of blocks B are laminated, to relatively displace the angles of the blocks B, which includes to laminate the blocks B while rotating the blocks B. The rotational stack is performed mainly for the purpose of compensating thickness variations of the blanked members 30. In order to obtain a laminate 10, the blanked members 30 may be rotationally stacked on a one-by-one basis. The angle of the rotational stack may be set to any angle. This rotationally stacking process may be performed in the inside of a blanking device 130 described later (what is called "internal rotational stack"), or may be performed in the outside of the blanking device 130 (what is called "external rotational stack").

Figure 4:
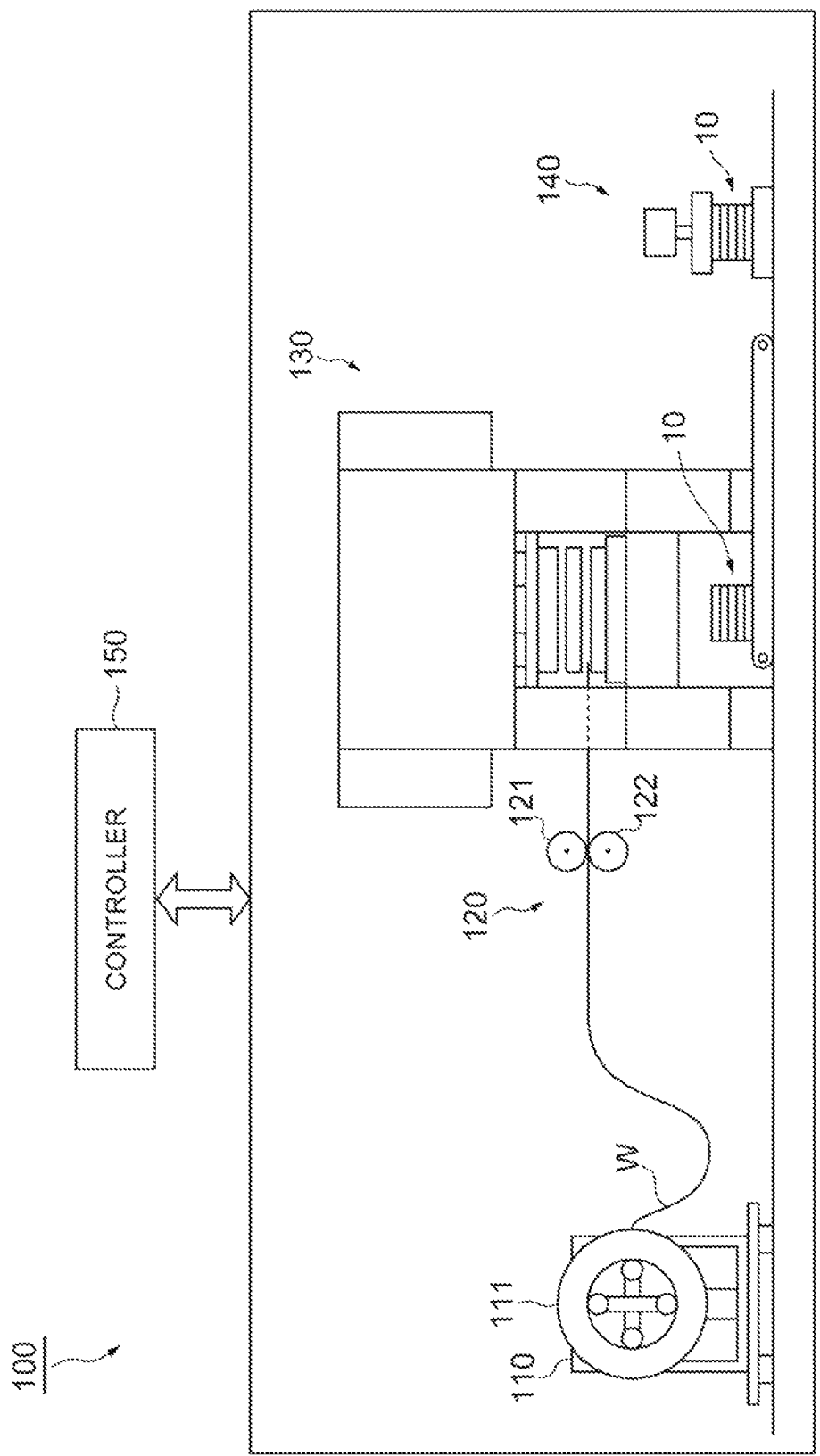
FIG. 4 is a schematic diagram illustrating one example of a manufacturing apparatus for a laminated core.

The blanked members 30 are obtained by processing (e.g., blanking, lancing) an electrical steel sheet W (see FIG. 4). When temporarily-interlocking portions are not formed on each blanked member 30, the shape of the blanked members 30 when viewed from a central axis Ax (see FIG. 1) direction is substantially the same as the shape of the laminate 10 when viewed from the central axis Ax direction (see FIG. 3).

Referring back to FIG. 1, the laminate 10 has a cylindrical shape. In other words, in a central portion of the laminate 10, a through hole 10a extending along the central axis Ax is formed. In the through hole 10a, a laminated rotor core (rotor) (not depicted) can be disposed. Thus, the laminated stator core 1 and the laminated rotor core can constitute an electric motor (motor).

The laminate 10 has a yoke portion 11 and a plurality of tooth portions 12 (six tooth portions 12 in FIG. 1). The yoke portion 11 has an annular shape, and extends so as to surround the central axis Ax. The width of the yoke portion 11 in the radial direction, the inner diameter of the yoke portion 11, the outer diameter of the yoke portion 11, and the thickness of the yoke portion 11 can be set to various sizes each depending on the usage and performance of the motor.

Each tooth portion 12 extends along the radial direction of the laminate 10 (hereinafter simply called "radial direction") so as to extend from an inner edge of the yoke portion 11 toward the central axis Ax. In the laminate 10 depicted in FIG. 1, the respective tooth portions 12 are formed integrally with the yoke portion 11.

The tooth portions 12 are aligned at substantially regular intervals in the circumferential direction. The width of each tooth portion 12 in the circumferential direction, the length of each tooth portion 12 in the radial direction, the spacing between the adjacent tooth portions 12, and the thickness of each tooth portion 12 can be set to various sizes depending on the usage and performance of the motor.

When the laminated stator core 1 is formed as a motor, a wire (not depicted) is wound on each tooth portion 12 by a predetermined number of turns. Between the adjacent tooth portions 12, a slot 10b serving as a space for disposing the wire is defined. In each tooth portion 12, a swaged area C is formed.

As depicted in FIG. 1 and FIG. 2, the distinguishing mark 20 is formed with a marking that is placed on a peripheral surface S of the laminate 10 so as to be continuously positioned over of the blocks B. Examples of a method for placing the marking include contact marking in which the peripheral surface S is directly touched and non-contact marking in which the peripheral surface S is not touched. Examples of the contact marking include a method in which, for example, a worker draws the distinguishing mark 20 on the peripheral surface S with a pen (a method of placing ink of the pen on the peripheral surface S) and a method in which a stamp is put on the peripheral surface S to form the distinguishing mark 20 on the peripheral surface S (a method of placing ink of the stamp on the peripheral surface S). Examples of the non-contact marking include a method in which ink is injected onto the peripheral surface S by an inkjet printer, for example, to form the distinguishing mark 20 on the peripheral surface S and a method (laser printing) in which the peripheral surface S is processed with a laser to form the distinguishing mark 20 on the peripheral surface S.

The distinguishing mark 20 has marking lines 21 and 22 extending in the laminating direction. In other words, the distinguishing mark 20 includes two portions extending in the laminating direction. Thus, as in the example depicted in FIG. 1 to FIG. 3, when the laminate 10 includes three or more blocks B ($1^{st}$ to $(N+1)^{st}$ blocks B), the distinguishing mark 20 has two different intersections $Pn_1$ and $Pn_2$ at a boundary between the $n^{th}$ (n is a natural number of 1 to N) block Bn among the $1^{st}$ to $(N+1)^{th}$ blocks $B_1$ to $B_{N+1}$ and the $(n+1)^{th}$ block Bn+1 among the $1^{st}$ to $(N+1)^{th}$ blocks $B_1$ to $B_{N+1}$. In the present embodiment, for all n, formula 3 below is satisfied.

$$Ln \neq Lm \qquad (3)$$

where Ln is a separation distance between the intersection $Pn_1$ and $Pn_2$; and m is any natural number of 1 to N except n. In other words, for all n, formula 4 below is satisfied.

$$Dn \neq Dm \qquad (4)$$

where Dn is a separation distance between the marking line 21 (first marking line) and the marking line 22 (second marking line at a boundary between the $n^{th}$ (n is a natural number of to N) block Bn and the $(n+1)^{th}$ block Bn+1.

In the present specification, as the "separation distance", a surface distance along the peripheral surface of the laminate 10 may be used as a measure, or a direct distance when the laminate 10 is viewed from the side may be used as a measure.

In the example depicted in FIG. 1 to FIG. 3 (example of N=5), as depicted in FIG. 2, the distinguishing mark 20 (marking lines 21 and 22) has the intersections $P1_1$ and $P1_2$ at the boundary between the block B1 and the block B2, and L1 is the separation distance between these intersections $P1_1$ and $P1_2$. The distinguishing mark 20 (marking lines 21 and 22) has the intersections $P2_1$ and $P2_2$ at the boundary between the block B2 and the block B3, and L2 is the separation distance between these intersections $P2_1$ and $P2_2$. The distinguishing mark 20 (marking lines 21 and 22) has the intersections $P3_1$ and $P3_2$ at the boundary between the block B3 and the block B4, and L3 is the separation distance between these intersections $P3_1$ and $P3_2$. The distinguishing mark 20 (marking lines 21 and 22) has the intersections $P4_1$ and $P4_2$ at the boundary between the block B4 and the block B5, and L4 is the separation distance between these intersections $P4_1$ and $P4_2$. The distinguishing mark 20 (marking lines 21 and 22) has the intersections $P5_1$ and $P5_2$ at the boundary between the block B5 and the block B6, and L5 is the separation distance between these intersections $P5_1$ and $P5_2$. L1 is not equal to any of L2 to L5. L2 is not equal to any of L1 and L3 to L5. L3 is not equal to any of L1, L2, L4, and L5. L4 is not equal to any of L1 to L3 and L5. L5 is not equal to any of L1 to L4.

Meanwhile, D1 (=L1) is the separation distance between the marking lines 21 and 22 at the boundary between the block B1 and the block B2. In the same manner, D2 (=L2) is the separation distance between the marking lines 21 and 22 at the boundary between the block. B2 and the block D3, D3 (=L3) is the separation distance between the marking lines 21 and 22 at the boundary between the block B3 and the block B4, D4 (=L4) is the separation distance between the marking lines 21 and 22 at the boundary between the block B4 and the block B5, and D5 (=L5) is the separation distance between the marking lines 21 and 22 at the boundary between the block B5 and the block B6. D1 is not equal to any of D2 to D5. D2 is not equal to any of D1 and D3 to D5. D3 is not equal to any of D1, D2, D4, and D5. D4 is not equal to any of D1 to D3 and D5. D5 is not equal to any of D1 to D4.

In the example depicted in FIG. 1 and FIG. 2, the marking lines 21 and 22 are asymmetrical with respect to an imaginary line VL (see FIG. 2) extending through the center of the laminate 10 in the laminating direction when viewed from the peripheral surface S. In the example depicted in FIG. 1 and FIG. 2, the marking lines 21 and 22 are positioned closer to each other from the block B6 toward the block B1. In other words, the distinguishing mark 20 including the marking lines 21 and 22 has portions that are positioned closer to each other from the block B6 toward the block B1. This satisfies L1=D1<L2=D2<L3=D3<L4=D4<L5=D5. In the example depicted in FIG. 1 and FIG. 2, the marking lines 21 and 22 do not intersect each other.

[Manufacturing Apparatus for Laminated Stator Core]

The following describes a manufacturing apparatus 100 for the laminated stator core 1 with reference to FIG. 4. The manufacturing apparatus 100 is an apparatus for manufacturing the laminated stator core 1 from the electrical steel sheet W (workpiece plate) that is a belt-like metal sheet. The manufacturing apparatus 100 includes an uncoiler 110, a feeder 120 (feeding unit), a blanking device 130, a lamination-height checker 140, and a controller 150 (control unit).

The uncoiler 110 rotatably holds a coil material 111 that is the belt-like electrical steel sheet W wound in a coil shape while the coil material 111 is being mounted thereon. The feeder 120 has a pair of rollers 121 and 122 that sandwich the electrical steel sheet W from above and below. The pair of rollers 121 and 122 rotate and stop in response to instruction signals from the controller 150 to intermittently and sequentially feed the electrical steel sheet W toward the blanking device 130.

The length of the electrical steel sheet W forming the coil material 111 may be about 500 m to 10000 m, for example. The thickness of the electrical steel sheet W may be about 0.1 mm to 0.5 mm, for example. The thickness of the electrical steel sheet W may be about 0.1 ram to 0.3 mm, for example, from a viewpoint of obtaining the laminated stator core 1 having more excellent electrical properties. The width of the electrical steel sheet W may be about 50 mm to 500 mm, for example.

The blanking device 130 operates in response to instruction signals from the controller 150. The blanking device 130 has a function of sequentially blanking the electrical steel sheet W intermittently fed by the feeder 120 to form blanked members 30 and a function of sequentially laminating and stacking the blanked members 30 to produce a laminate 10.

The lamination-height checker 140 operates in response to instruction signals from the controller 150. The lamination-height checker 140 has a function of determining whether the lamination height (height of the laminate 10 in the laminating direction) of the laminate 10 produced by the blanking device 130 is within a predetermined appropriate range. The lamination-height checker 140 detects the lamination height of the laminate 10 while applying a predetermined load onto the laminate 10 from the laminating direction. The load applied onto the laminate 10 varies in magnitude depending on the size of the laminate 10, and may have a magnitude satisfying a condition that the thickness T of the laminate 10 after being pressed is equal to or greater than 99.9% of a thickness T0 that is the thickness of the laminate 10 before being pressed and is smaller than the thickness T0 ($0.999T0 \leq T < T0$).

Based on a program recorded in a recording medium (not depicted) or a manipulated input from an operator, for example, the controller 150 generates instruction signals for operating the feeder 120, the blanking device 130, and the lamination-height checker 140, and sends the signals to the feeder 120, the blanking device 130, and the lamination-height checker 140, respectively.

[Method for Manufacturing Laminated Stator Core]

Figure 5:
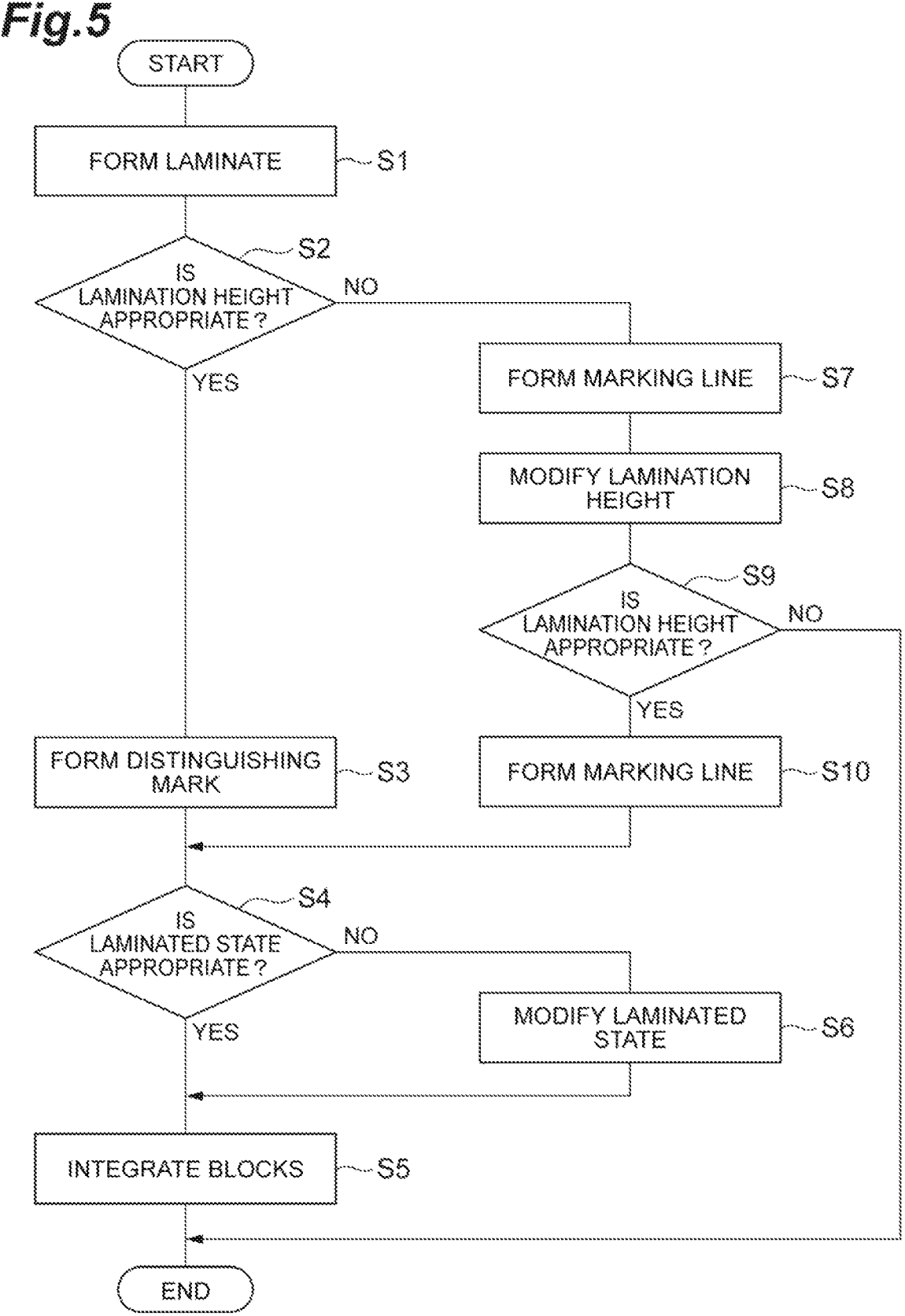
FIG. 5 is a flowchart for explaining one example of a method for manufacturing the laminated core.

The following describes a method for manufacturing the laminated stator core 1 with reference to FIG. 5. To begin with, a laminate 10 is formed (first step; see step S1 in FIG. 5). Specifically, the feeder 120 feeds an electrical steel sheet W to the blanking device 130, and the blanking device 130 blanks a portion to be worked of the electrical steel sheet W into a predetermined shape. Accordingly, a blanked member 30 is formed. This blanking is repeated, whereby a predetermined number of blanked members 30 are laminated while being fastened to each other by swaged areas C to form a block B. Subsequently, the blanking device 130 further stacks a plurality of blanked member 30 on the block B to laminate another block B on the block B. The blanking device 130 repeats this stacking, thereby laminating a plurality of blocks B to form a laminate 10. At this time, the blocks B constituting the laminate 110 are not fastened to each other, and are thus in a state of being able to be freely moved or removed.

Subsequently, the laminate 10 formed by the blanking device 130 is conveyed to the lamination-height checker 140 to check the lamination height of the laminate 10 in the lamination-height checker 140. The laminate 10 may be conveyed from the blanking device 130 to the lamination-height checker 140 automatically by a conveying device (e.g., a belt conveyor), or may be conveyed by a worker. When the worker conveys the laminate 10, the worker may use a dolly, for example, or may carry the laminate in his/her arms.

Subsequently, the lamination-height checker 140 determines whether the lamination height of the laminate 10 is within the predetermined appropriate range (fourth step; see step S2 in FIG. 5). If the lamination-height checker 140 has determined that the lamination height of the laminate 10 is within the appropriate range, a distinguishing mark 20 is formed on the peripheral surface S of the laminate 10 (second step; see step S3 in FIG. 5).

Figure 6A:
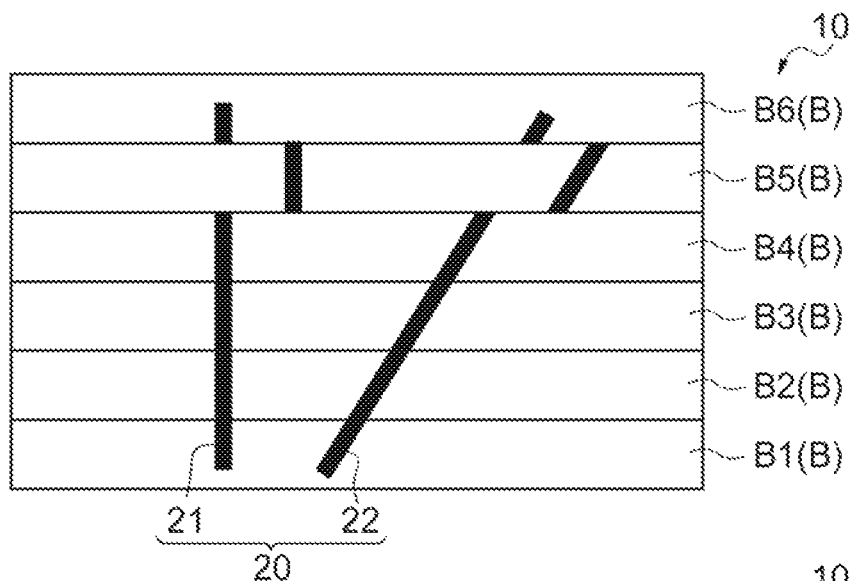
FIG. 6A to FIG. 6C are diagrams for explaining laminated states of the laminated core.
Figure 6B:
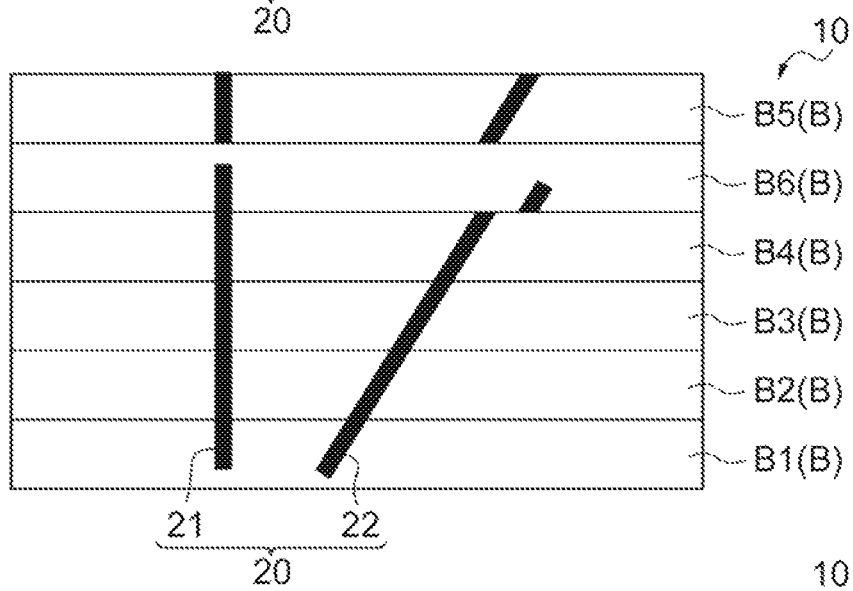
Figure 6C:
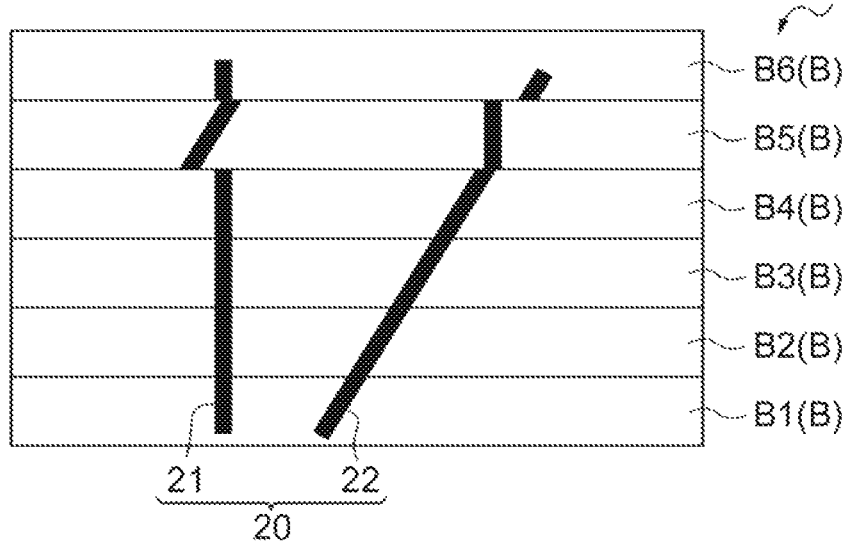

Herein, during a period after the distinguishing mark 20 is formed on the peripheral surface S of the laminate 10 until the blocks B constituting the laminate 10 are fastened together, due to some cause (e.g., an impact from outside), rotational displacement may occur between the blocks B (see FIG. 6A). Similarly, the lamination order of the blocks B may be misaligned (see FIG. 6B), or the up/down orientation of the blocks B may be changed (see FIG. 6C). In FIG. 6A, among six blocks B1 to B6, the block B5 has been rotationally displaced. In FIG. 6B, among the six blocks B1 to B6, the lamination orders of the blocks B5 and B6 have been replaced with each other. In FIG. 6C, among the six blocks B1 to B6, the up down orientation of the block B5 has been changed.

In view of such situations, after the distinguishing mark 20 is placed on the peripheral surface S of the laminate 10 at step S3, whether the laminated state of the laminate 10 is appropriate is determined (third step; see step S4 in FIG. 5). Specifically, whether the shape of the distinguishing mark 20 formed at step S3 has deformed from the original shape is determined. At step S4, the laminated state may be automatically determined by capturing an image of the peripheral surface S of the laminate 10 with au image-capturing device, for example, to perform image processing, or the laminated state may be determined by a visual inspection performed by a worker.

If the laminated state is appropriate as a result of having determined the laminated state at step S4, the blocks B are integrated together by welding, for example (see step S5 in FIG. 5). By this integration, a laminated stator core 1 is obtained, and the manufacturing process of the laminated stator core 1 ends.

If the laminated state is not appropriate as a result of having determined the laminated state at step S4, the laminated state of the laminate 10 is modified such that the shape of the distinguishing mark 20 formed at step S3 becomes the original shape (see step S6 in FIG. 5). Specifically, in FIG. 6A, the laminated state is modified by displacing the block B5 to the original position. In FIG. 6B, the laminated state is modified by replacing the orders of the blocks B5 and B6 with each other. In FIG. 6C, the laminated state is modified by changing the up/down orientation of the block B5. Subsequently, the process proceeds to step S5, and the blocks B are integrated together.

At step S2, if the lamination-height checker 140 has determined that the lamination height of the laminate 10 exceeds the appropriate range, a marking line 21 is formed on the peripheral surface S of the laminate 10 (fifth step; see step S7 in FIG. 5). Herein, if the lamination height of the laminate 10 is lower than the appropriate range, the laminate 10 is handled as a defective product and the processes on the laminate 10 end because it is usually difficult to return the laminate 10 to the blanking device 130 and laminate an additional blanked member 30 thereon.

Subsequently, the lamination height of the laminate 10 is modified such that the lamination height of the laminate 10 is within the appropriate range (sixth step; see step S8 in FIG. 5). Specifically a predetermined number of blanked members 30 are removed from the laminate 10. Subsequently, the lamination-height checker 140 determines whether the lamination height of the laminate 10 is within the predetermined appropriate range (seventh step; see step S9 in FIG. 5).

If the lamination-height checker 140 has determined at step S9 that the lamination height of the laminate 10 is within the appropriate range, a marking line 22 is formed on the peripheral surface S of the laminate 10 (eighth step; see step S10 in FIG. 5). By this formation, a distinguishing mark 20 is placed on the peripheral surface S of the laminate 10. Subsequently, the processes at and after step S4 are performed.

If the lamination-height checker 140 has determined at step S9 that the lamination height of the laminate 10 is not within the appropriate range, the laminate 10 is handled as a defective product and the processes on the laminate 10 end.

[Effects]

In the manufacturing methods of Japanese Unexamined Patent Publication No. 2015-097466 and Japanese Unexamined Patent Publication No. 2011-010389, during a period until the blanked members or the blocks are integrated together at the integrating step, rotational displacement may occur between the blanked members or the blocks when the laminate receives an impact or the like from outside. In particular, the thickness of the metal sheet from which the blanked members are blanked is not uniform in the plane thereof. In other words, thickness variations exist in the metal sheet. Consequently, when rotational displacement occurs between the blanked members or the blocks during a period until the integrating step, the dimensions of the entire laminated core may vary.

In the present embodiment described above, however, the distinguishing mark 20 is formed by placing a marking on the peripheral surface S of the laminate 10 (see step S3 in FIG. 5). Thus, when the blocks B constituting the laminate 10 are rotationally displaced, the shape of the distinguishing mark 20 formed on the peripheral surface of the laminate 10 deforms from the original one or becomes discontinuous. Thus, the rotational displacement can be easily found based on the distinguishing mark 20, and the rotational displacement of the laminate 10 can be solved by displacing the blocks B such that the shape of the distinguishing mark 20 becomes the original shape. Consequently, the rotational displacement of the laminate 10 can be prevented.

In the present embodiment, whether the lamination height of the laminate 10 is within the appropriate range is determined at step S2, and if the lamination height of the laminate 10 is within the appropriate range, the distinguishing mark 20 is formed on the peripheral surface S of the laminate 10 (see step S3 in FIG. 5). Thus, the distinguishing mark 20 is formed on this non-defective laminate 10, and thus the quality of the laminate 10 (whether the laminate 10 has an appropriate lamination height) can be easily identified. Furthermore, even if an abnormality such as displacement occurs in the laminate 10, the laminate 10 can be restored to a non-defective condition by displacing the blocks B such that the shape of the distinguishing mark 20 becomes the original shape.

In the present embodiment, when it has been determined at step S2 that the lamination height of the laminate 10 exceeds the appropriate range, the marking line 21 is formed on the peripheral surface S of the laminate 10 (see step S7 in FIG. 5). The lamination height of the laminate 10 is modified at step S8, and when it has been determined at step S9 that the lamination height of the laminate 10 is within the appropriate range, the marking line 22 is formed on the peripheral surface S of the laminate 10, and consequently a distinguishing mark 20 that is similar to the distinguishing mark obtained at step S3 is formed on the peripheral surface S of the laminate 10. If the lamination height of the laminate 10 is not within the appropriate range at step S9, the marking line 22 is not formed on the peripheral surface S of the laminate 10, and thus the marking line 21 exists on the peripheral surface S of the laminate 10. Thus, whether the laminate 10 has a lamination height that has become appropriate because of adjustment of the lamination height at step S8 can be identified by the fact that the marking line 21 exists on the peripheral surface S of the laminate 10 or the fact that the distinguishing mark 20 (the marking lines 21 and 22) exists.

In the present embodiment, the separation distance Ln between two intersections $Pn_1$ and $Pn_2$ satisfies formula 3. Thus, based on the separation distance Ln, the $1^{st}$ to $(N+1)^{th}$ blocks B are individually identified. Thus, after the laminate 10 has been obtained, even if an abnormality in which the order of the blocks B is changed or the up/down orientation of the blocks B is changed has occurred, the abnormality can be easily found based on the distinguishing mark 20, and the abnormality of the laminate 10 can be solved by, for example, stacking again the blocks B such that the shape of the distinguishing mark 20 becomes the original shape.

In the present embodiment, the separation distance Dn between the marking lines 21 and 22 satisfies formula 4. Thus, based on the separation distance Dn, the $1^{st}$ to $(N+1)^{th}$ blocks B are individually identified. Thus, after the laminate 10 has been obtained, even if an abnormality in which the order of the blocks B is changed or the up/down orientation of the blocks B is changed has occurred, the abnormality can be easily found based on the distinguishing mark 20, and the abnormality of the laminate 10 can be solved by, for example, stacking again the blocks B such that the shape of the distinguishing mark 20 becomes the original shape.

In the present embodiment, when viewed from the peripheral surface S, the marking lines 21 and 22 are asymmetrical with respect to the imaginary line VL. Thus, based on the shape of the distinguishing mark 20, the block B1 side or the block B6 side of the laminate 10 can be easily identified.

In the present embodiment, the marking line 21 and the marking line 22 are positioned closer to each other from the block B6 toward the block B1. Thus, the marking line 21 and the marking line 22 come closest to or come into contact with each other at the block B1. Thus, based on the shape of the distinguishing mark 20, the block B1 positioned in an end in the laminating direction can be easily identified.

Other Embodiments

Figure 7A:
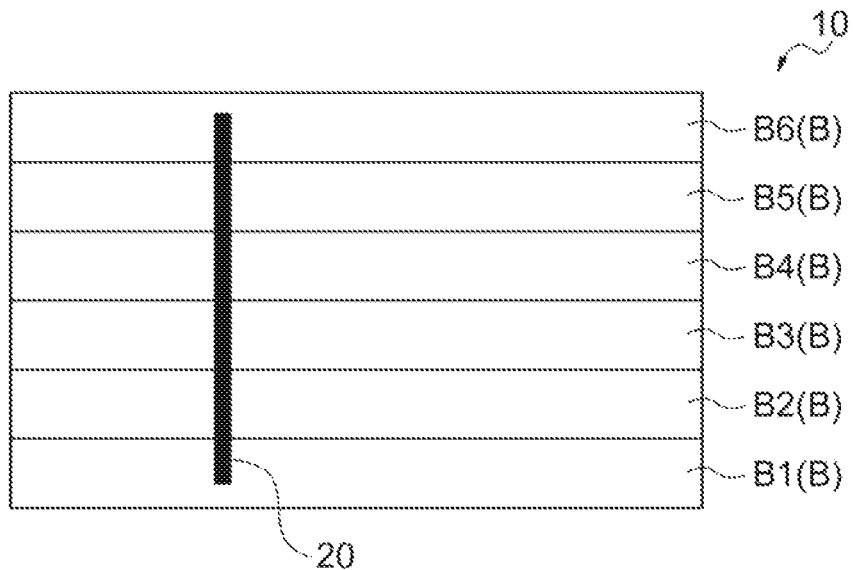
FIG. 7A and FIG. 7B are diagrams illustrating other examples of a distinguishing mark.
Figure 7B:
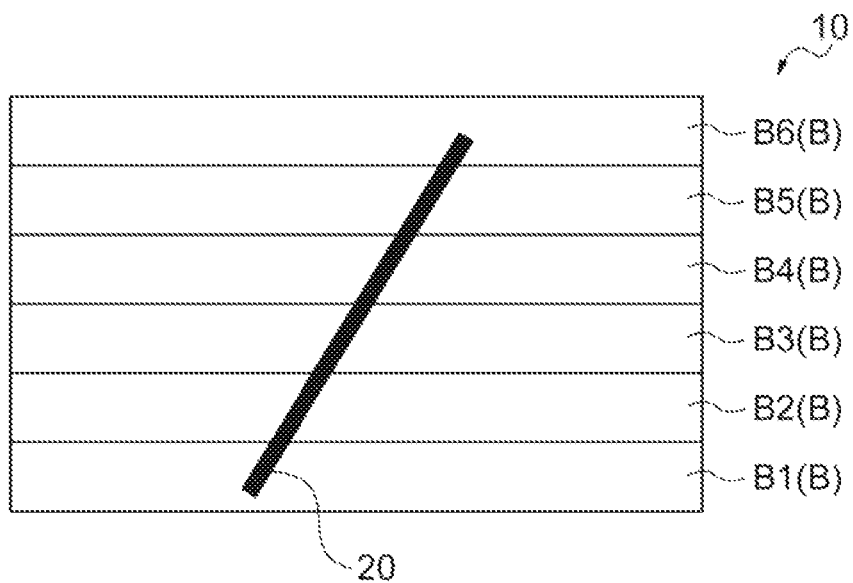
Figure 8A:
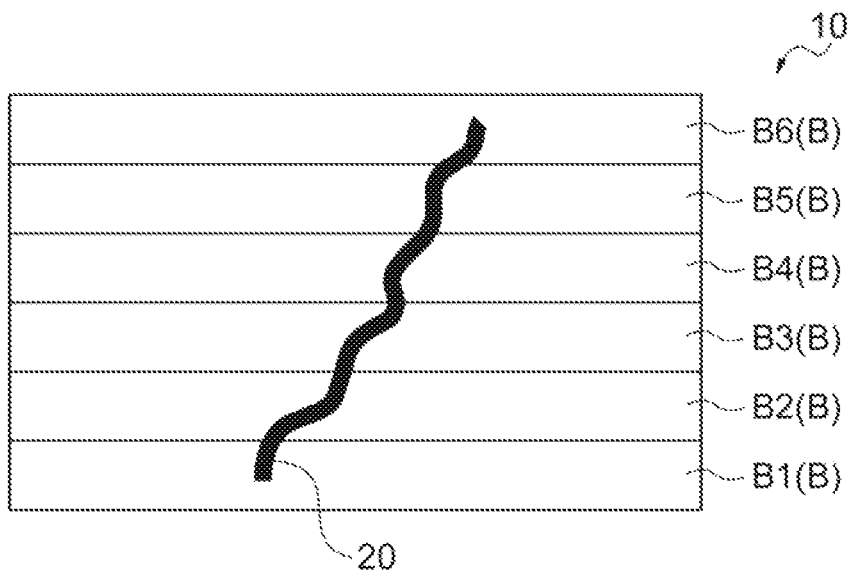
FIG. 8A and FIG. 8B are diagrams illustrating other examples of the distinguishing mark.

Although an embodiment according to the present disclosure has been described above in detail, various modifications may be made to the embodiment within the scope of the present invention. For example, the distinguishing mark 20 may include one marking line as depicted in FIG. 7A, FIG. 7B, and FIG. 8A. The distinguishing mark 20 illustrated in FIG. 7A is a straight line extending in the laminating direction. The distinguishing mark 20 illustrated in FIG. 7B is a straight line extending obliquely with respect to the laminating direction.

The marking line constituting the distinguishing mark 20 may be, as depicted in FIG. 8A, a marking line other tan a straight line. Specifically, the marking line constituting the distinguishing mark 20 may be a straight line, may be a curved line, or may be a combination of a straight line and a curved line. The marking line constituting the distinguishing mark 20 may be bent at some midpoint.

Figure 8B:
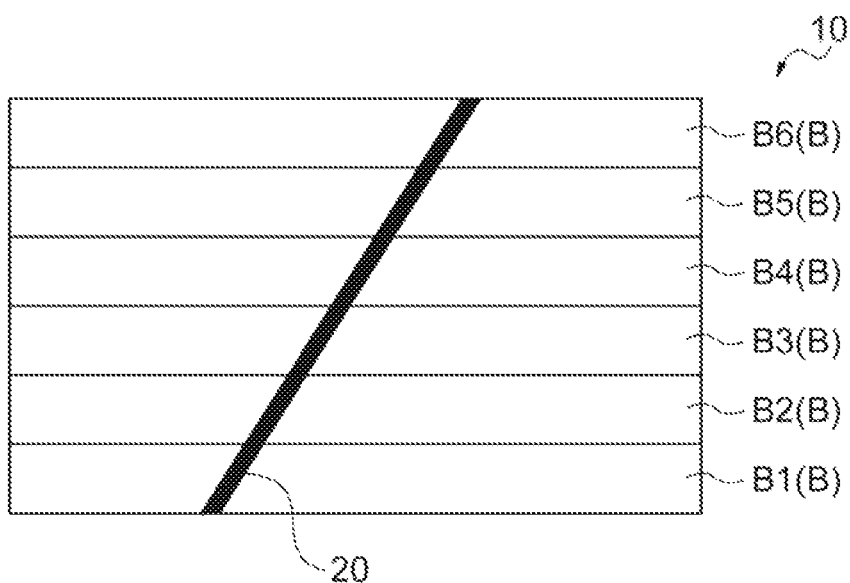

The marking line constituting the distinguishing mark 20 may, as depicted in FIG. 8B, extend from a surface of the block B1 to a surface of the block B6 (from the upper surface of the laminate 10 to the lower surface thereof) in the peripheral surface S of the laminate 10.

As illustrated in FIG. 1 to FIG. 3 in the embodiment above, the marking lines 21 and 22 do not have to intersect. As illustrated in FIG. 9A to FIG. 9C, FIG. 10A, and FIG. 10B, the marking lines 21 and 22 may intersect.

Figure 9A:
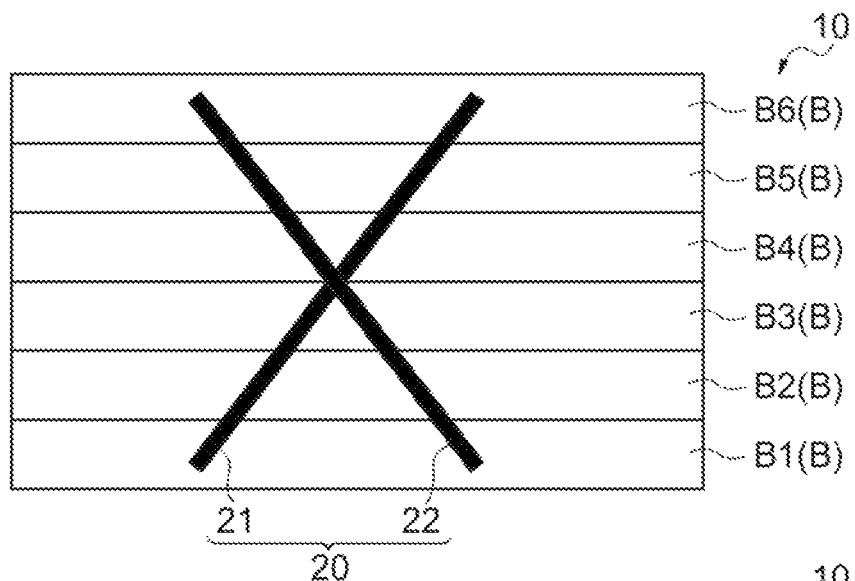
FIG. 9A to FIG. 9C are diagrams illustrating other examples of the distinguishing mark.
Figure 9B:
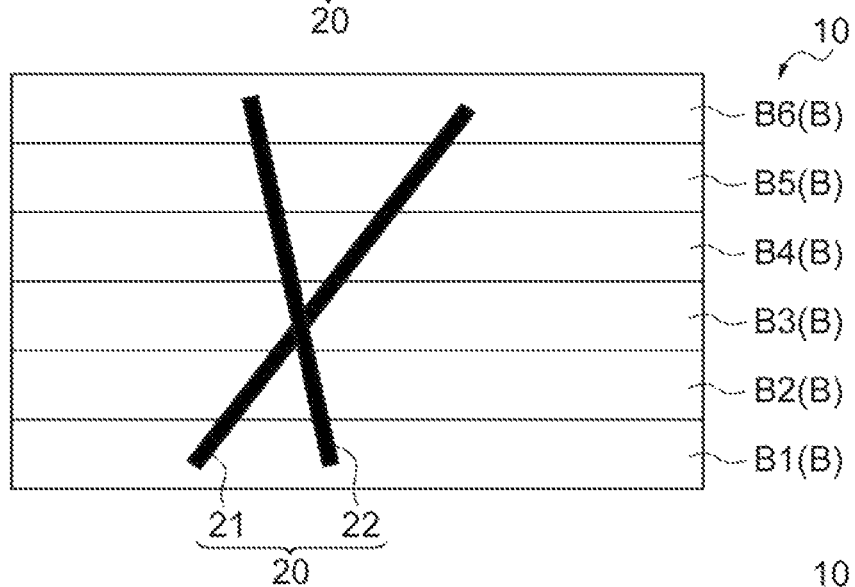

As illustrated in FIG. 9A, the distinguishing mark 20 may have a symmetrical shape with respect to the imaginary line VL. As depicted in FIG. 1 to 3, FIG. 7B, FIG. 8A, FIG. 8B, FIG. 9B, FIG. 9C, FIG. 10A, and FIG. 10B, the distinguishing mark 20 may have an asymmetrical shape with respect to the imaginary line VL. The distinguishing marks 20 in FIG. 9A and FIG. 9B have X-shapes. The distinguishing marks 20 in FIG. 9C and FIG. 10A have V-shapes. The distinguishing mark 20 in FIG. 10B has a U-shape.

Figure 9C:
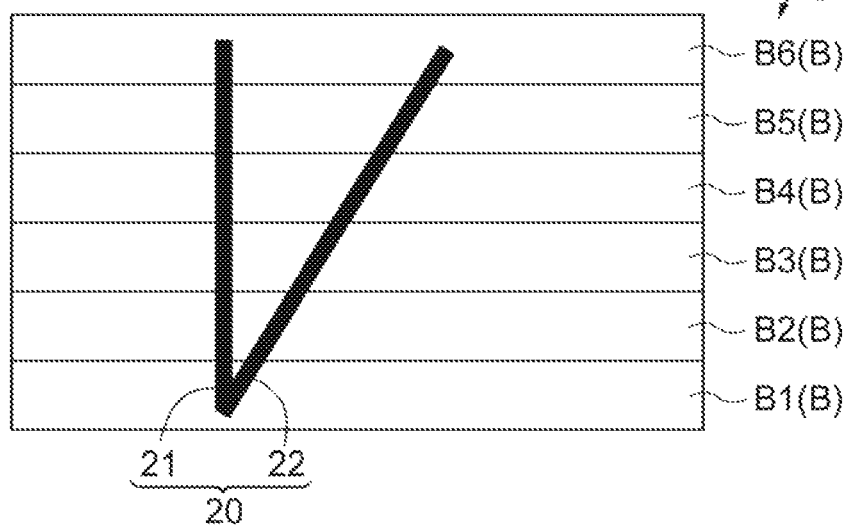
Figure 10A:
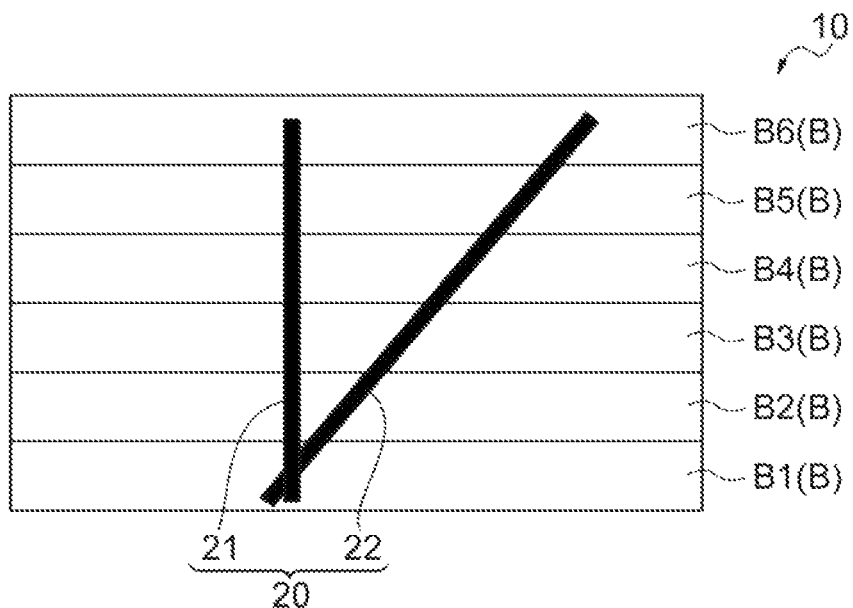
FIG. 10A and FIG. 10B are diagrams illustrating other examples of the distinguishing mark.
Figure 10B:
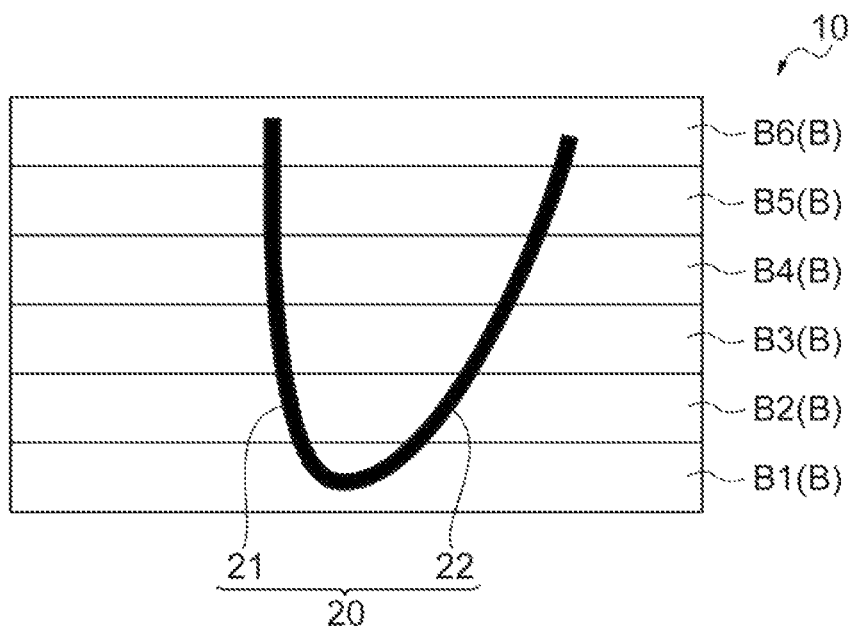

As illustrated in FIG. 9B, FIG. 9C, FIG. 10A, and FIG. 10B, a point at which the marking lines 21 and 22 intersect may be located near the uppermost or the lowermost block B (near the block B1 in each drawing). As illustrated in FIG. 9C, FIG. 10A, and FIG. 10B, a point at which the marking lines 21 and 22 intersect may be located on the uppermost or the lowermost block B (on the block B1 in each drawing).

As illustrated in FIG. 9C and FIG. 10B, one end of the marking line 21 and one end of the marking line 22 may meet each other. In the distinguishing mark 20 in FIG. 10B, at an inflection point, one end of the marking line 21 and ono end of the marking line 22 are connected to each other. In contrast, as illustrated in FIG. 10A, one end of the marking line 21 and one end of the marking line 22 do not have to meet each other.

Figure 11A:
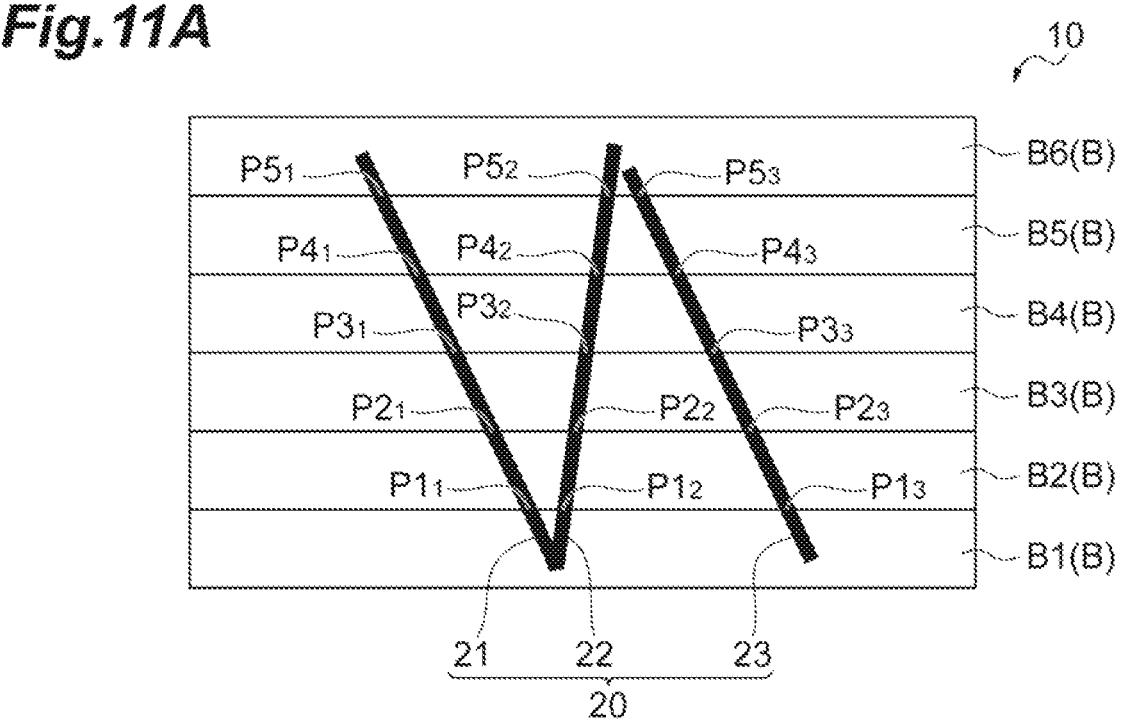
FIG. 11A and FIG. 11B are diagrams illustrating other examples of the distinguishing mark.

The distinguishing mark 20 may include two or more marking lines. For example, as depicted in FIG. 11A, the distinguishing mark 20 may include three marking lines 21 to 23. In the example depicted in FIG. 11A, the marking lines 21 and 22 are connected together on the block B1 to form one line as a whole. The marking line 23 does not intersect the marking lines 21 and 22.

In FIG. 11A, the distinguishing mark 20 has three intersections $Pn_1$, $Pn_2$, and $Pn_3$ that are aligned in this order in the circumferential direction at a boundary between the $n^{th}$ block Bn and the $(n+1)^{th}$ block Bn+1. In this case also, for all n, formulae 5 and 6 may be satisfied.

$$Ln_{12} \neq Lm_{12} \tag{5}$$

$$Ln_{23} \neq Lm_{23} \tag{6}$$

where $Ln_{12}$ and $Ln_{23}$ are a separation distance between the intersections $Pn_1$ and $Pn_2$ that are adjacent at the boundary between the $n^{th}$ block Bn and the $(n+1)^{th}$ block Bn+1 and a separation distance between the intersections $Pn_2$ and $Pn_3$ that are adjacent at the boundary, respectively.

Figure 11B:
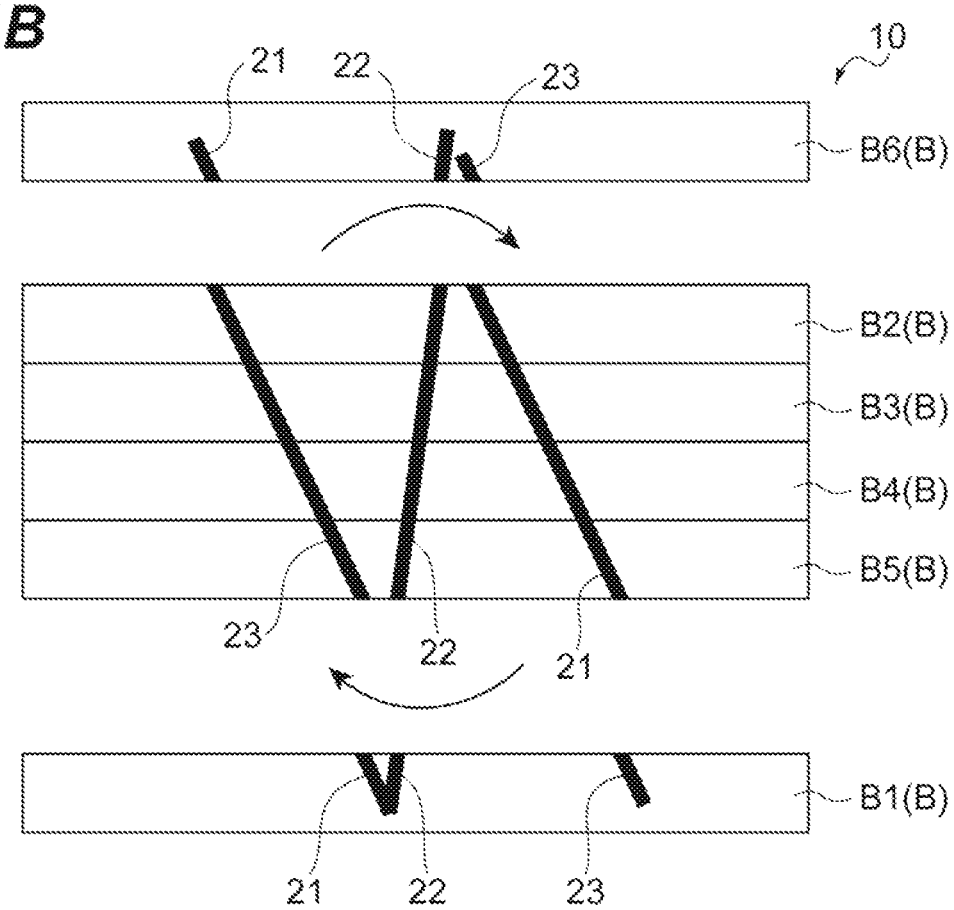

In the example (example of N=5) depicted in FIG. 11A and FIG. 11B, the separation distances $L1_{12}$ to $L5_{12}$, and $L1_{23}$ to $L5_{23}$ are defined as follows.

$L1_{12}$: separation distance between the intersections $P1_1$ and $P1_2$ adjacent in the circumferential direction of the laminate 10

$L2_{12}$: separation distance between the intersections $P2_1$ and $P2_2$ adjacent in the circumferential direction of the laminate 10

$L3_{12}$: separation distance between the intersections $P3_1$ and $P3_2$ adjacent in the circumferential direction of the laminate 10

$L4_{12}$: separation distance between the intersections $P4_1$ and $P4_2$ adjacent in the circumferential direction of the laminate 10

$L5_{12}$: separation distance between the intersections $P5_1$ and $P5_2$ adjacent in the circumferential direction of the laminate 10

$L1_{23}$: separation distance between the intersections $P1_2$ and $P1_3$ adjacent in the circumferential direction of the laminate 10

$L2_{23}$: separation distance between the intersections $P2_2$ and $P2_3$ adjacent in the circumferential direction of the laminate 10

$L3_{23}$: separation distance between the intersections $P3_2$ and $P3_3$ adjacent in the circumferential direction of the laminate 10

$L4_{23}$: separation distance between the intersections $P4_2$ and $P4_3$ adjacent in the circumferential direction of the laminate 10

$L5_{23}$: separation distance between the intersections $P5_2$ and $P5_3$ adjacent in the circumferential direction of the laminate 10

Herein, when an abnormality in the blocks B due to some cause has occurred (e.g., the lamination order has been changed, or the up/down orientation of the blocks B has been changed) in a process after this distinguishing mark 20 had been formed on the peripheral surface S of the laminate 10, there may be a situation in which it is difficult to find this abnormality even if formulae 5 and 6 are satisfied for all n. An example of such a situation is a situation as depicted in FIG. 11B in which the up/down orientation of the blocks B2 to B5 as an integral body positioned between the blocks B1 and B6 has been changed when $L1_{12}=L5_{23}$ and $L5_{12}=L1_{23}$. In view of this, if m that satisfies $Ln_{12}=Lm_{23}$ exists, formula 7 below may be satisfied for this m.

$$Lm_{12} \neq Ln_{23} \tag{7}$$

In other words, a pair of the separation distances $Ln_{12}$ and $Ln_{23}$ each between intersections adjacent at the boundary between the $n^{th}$ block Bn and $(n+1)^{th}$ block Bn+1 and a pair of the separation distances $Lm_{12}$ and $Lm_{23}$ each between intersections adjacent at the boundary between the $m^{th}$ block Bm and the $(m+1)^{th}$ block Bm+1 only need to be different. In the example depicted in FIG. 11A and FIG. 11B, when $L1_{12}=L5_{23}$ and $L5_{12} \neq L1_{23}$, even if the up/down orientation of the blocks B2 to B5 as an integral body positioned between the blocks B1 and B6 has been changed, this abnormality in the blocks B can be found.

Figure 12A:
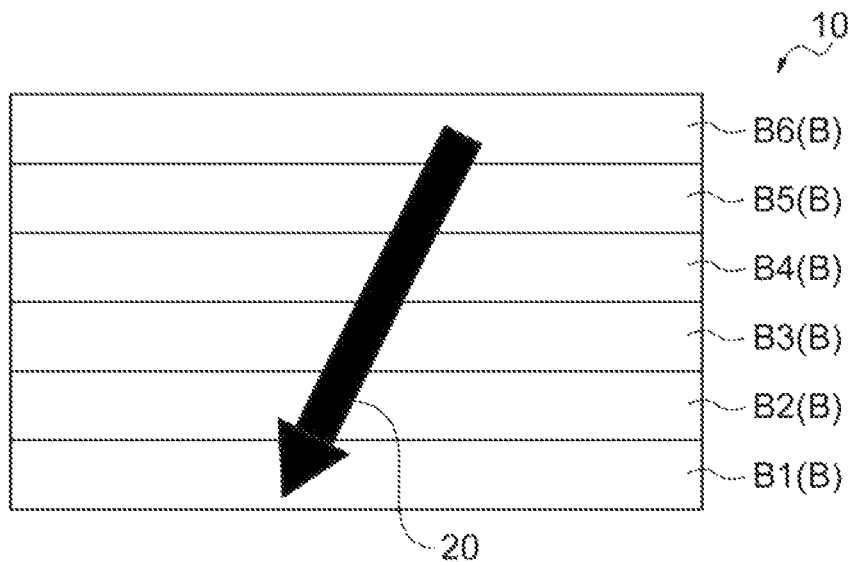
FIG. 12A and FIG. 12B are diagrams illustrating other examples of the distinguishing mark.
Figure 12B:
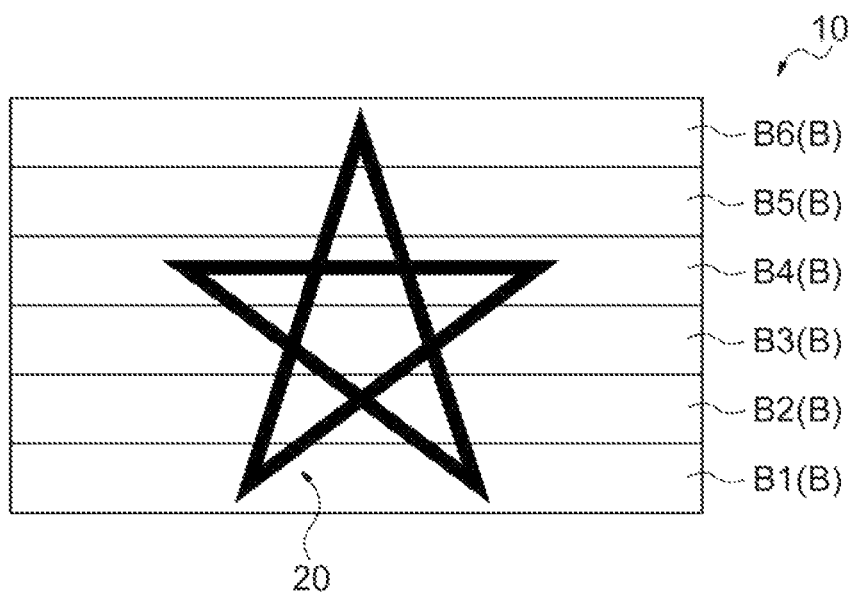

The distinguishing mark 20 may have a shape (e.g., a letter, a graphic, a symbol, a color, or an emblem combined with these items) other than that of the marking lines 21 and 22. The distinguishing mark 20 illustrated in FIG. 12A has a shape of an arrow symbol. Based on the direction of the arrow, the uppermost or the lowermost block B (the block B1 in FIG. 12A) can be identified. The distinguishing mark 20 illustrated in FIG. 12B has a shape of a star.

The distinguishing mark 20 may be formed after a plurality of blocks B are laminated to obtain a laminate 10 and before a process that causes displacement in the laminate 10 is performed.

The distinguishing mark 20 may be formed with a load being applied onto the laminate 10, or may be formed without a load being applied onto the laminate 10.

The distinguishing mark 20 may be formed on the outer-peripheral surface of the laminate 10 or may be formed on an inner-peripheral surface.

Figure 13:
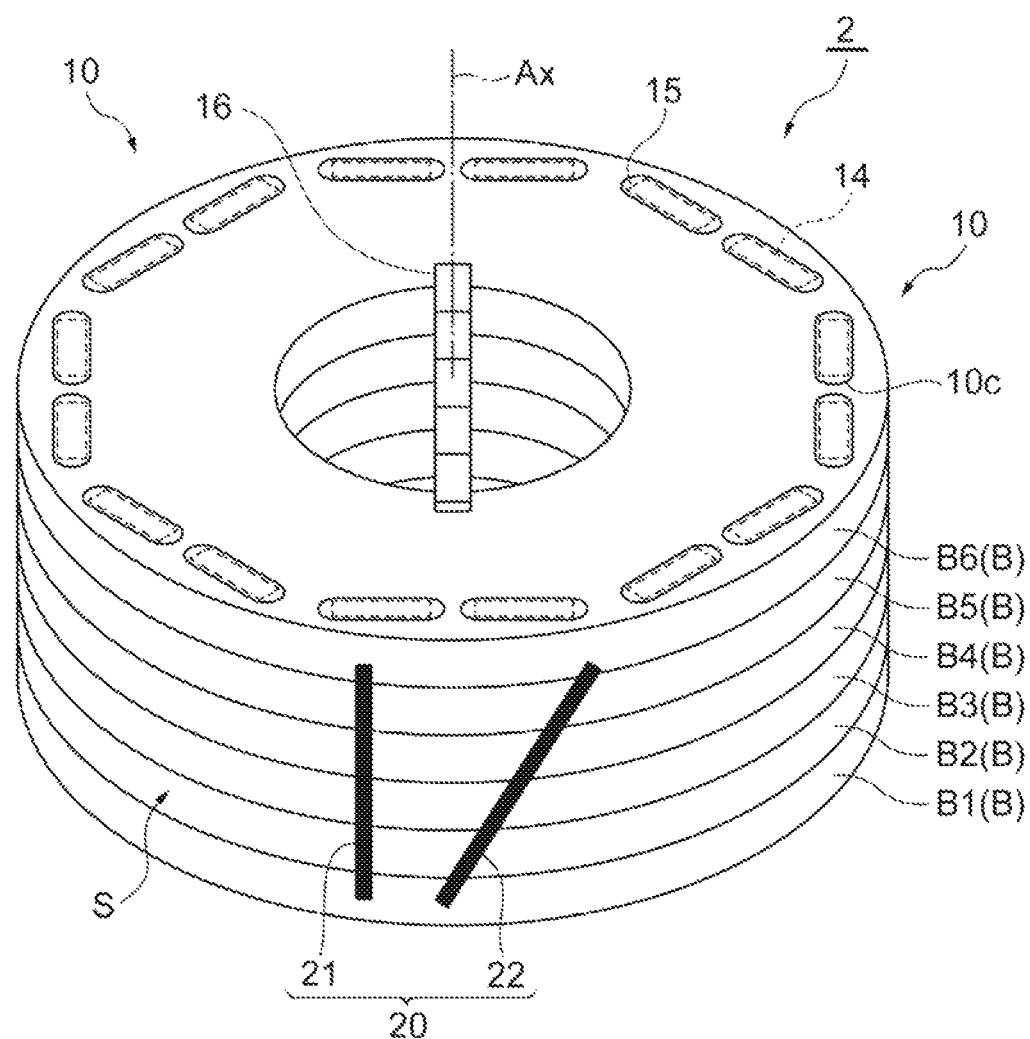
FIG. 13 is a perspective view illustrating one example of a laminated rotor core.

The present invention may be applied not only to the laminated stator core 1, but also to a laminated rotor core 2 (see FIG. 13). In the laminated rotor core 2 depleted in FIG. 13, in a laminate 10, a plurality of magnet insertion holes 10c are formed. The magnet insertion holes 10c are aligned at predetermined intervals along the outer periphery of the laminate 10. Into the magnet insertion holes 10c, permanent magnets 14 are inserted, and resin material 15 is injected.

Figure 14:
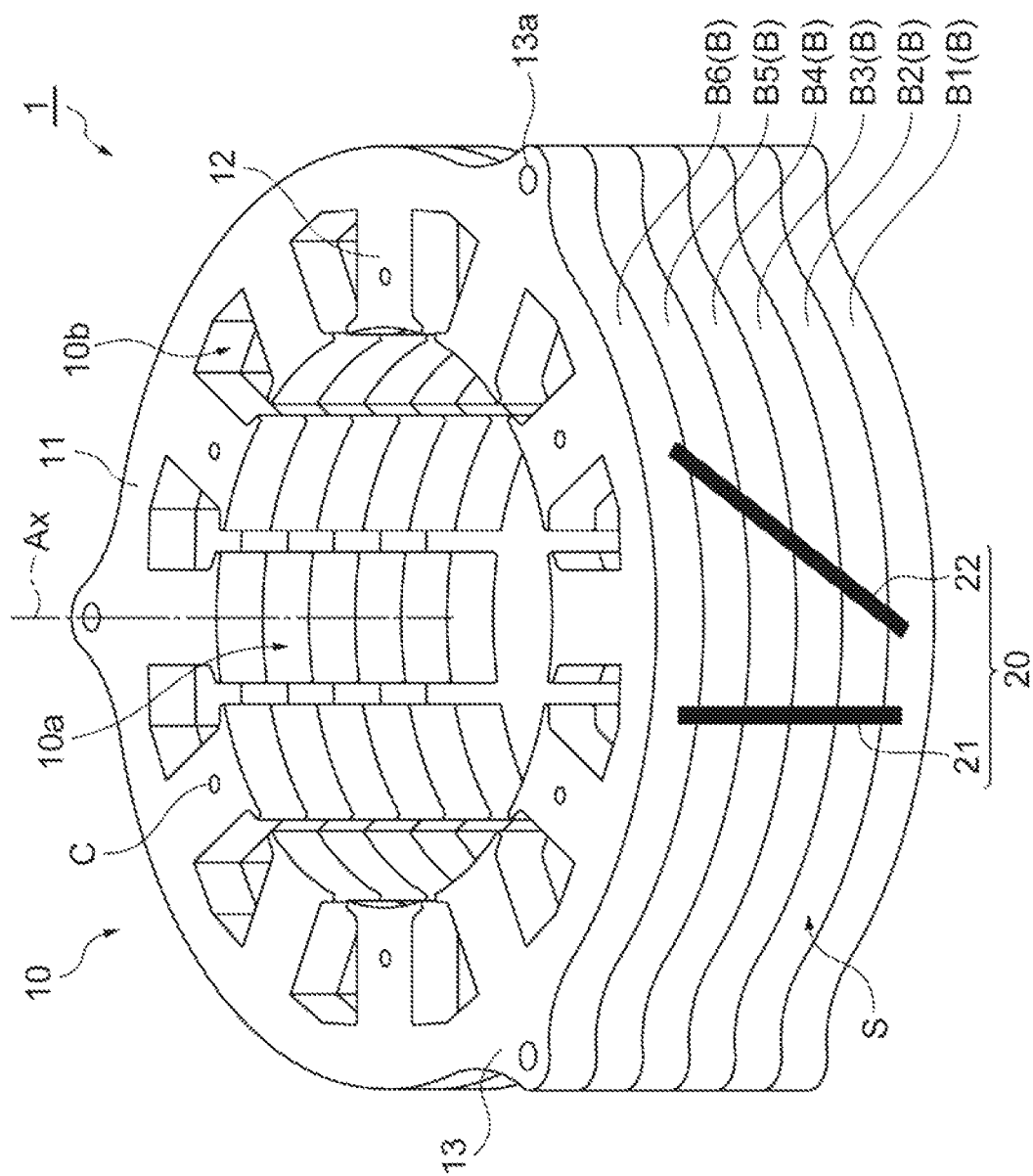
FIG. 14 is a perspective view illustrating another example of the laminated stator core.

On the inner-peripheral surface or the outer-peripheral surface of the laminate 10, an irregularly shaped portion having a projecting shape or a recessed shape may be formed. In the case of the laminated stator core 1, as depicted in FIG. 14, on the outer-peripheral surface of the laminate 10, a plurality of lug parts 13 may be formed as the irregularly shaped portion. The lug parts 13 protrude outward in the radial direction of the yoke portion 11 from an outer edge of the yoke portion 11. In each lug part 13, a through hole 13a that penetrates the lug put 13 in the extending direction of the central axis Ax is formed. The through hole 13a serves as an insertion hole for a bolt for fixing the laminated stator core 1 to a housing (not depicted) of the electric motor.

In the laminate 10 having such a lug part 13, the distinguishing mark 20 may be formed in a position, on the outer surface of the laminate 10, corresponding to the lug part 13. In the laminated stator core 1 illustrated in FIG. 14, the distinguishing mark 20 is located opposite to one of the lug parts 13. In this case, the position of this lug part 13 can be easily grasped based on the distinguishing mark 20. Thus, in a later process (e.g., a process of fixing the laminated stator core 1 to the housing of the electric motor), the lug part 13 can be positioned with reference to the distinguishing mark 20. Herein, the distinguishing mark 20 may be formed in any position other than the position, on the outer-peripheral, surface of the laminate 10, opposite to the predetermined lug part 13 in consideration of the shape of the laminated stator core 1 and a manufacturing line of the laminated stator core 1, for example.

In the case of the laminated rotor core 2, as depicted in FIG. 13, on the inner-peripheral surface of the laminate 10, a plurality of depressions 16 may be formed as the irregularly shaped portion. Each depression 16 is recessed radially outward from the inner-peripheral surface of the laminate 10. The depression 16 serves as a key groove into which a key member configured to couple the laminated rotor core 2 to a shaft (not depicted) is inserted.

In the laminate 10 having such a depression 16, the distinguishing mark 20 may be formed in a position, on the inner-peripheral surface of the laminate 10, corresponding to the depression 16. In the laminated rotor core 2 illustrated in FIG. 13, the distinguishing mark 20 is located opposite to one of the depressions 16. In this case, the position of this depression 16 can be easily grasped based on the distinguishing mark 20. Thus, in a later process (e.g., a process of coupling the laminated rotor core 2 to the shaft with the key member), the key member can be inserted into the corresponding depression 16 with reference to the distinguishing mark 20. Herein, the distinguishing mark 20 may be formed in any position other than the position, on the inner-peripheral surface of the laminate 10, opposite to the predetermined depression 16 in consideration of the shape of the laminated rotor core 2 and a manufacturing line of the laminated rotor core 2, for example.

Figure 15:
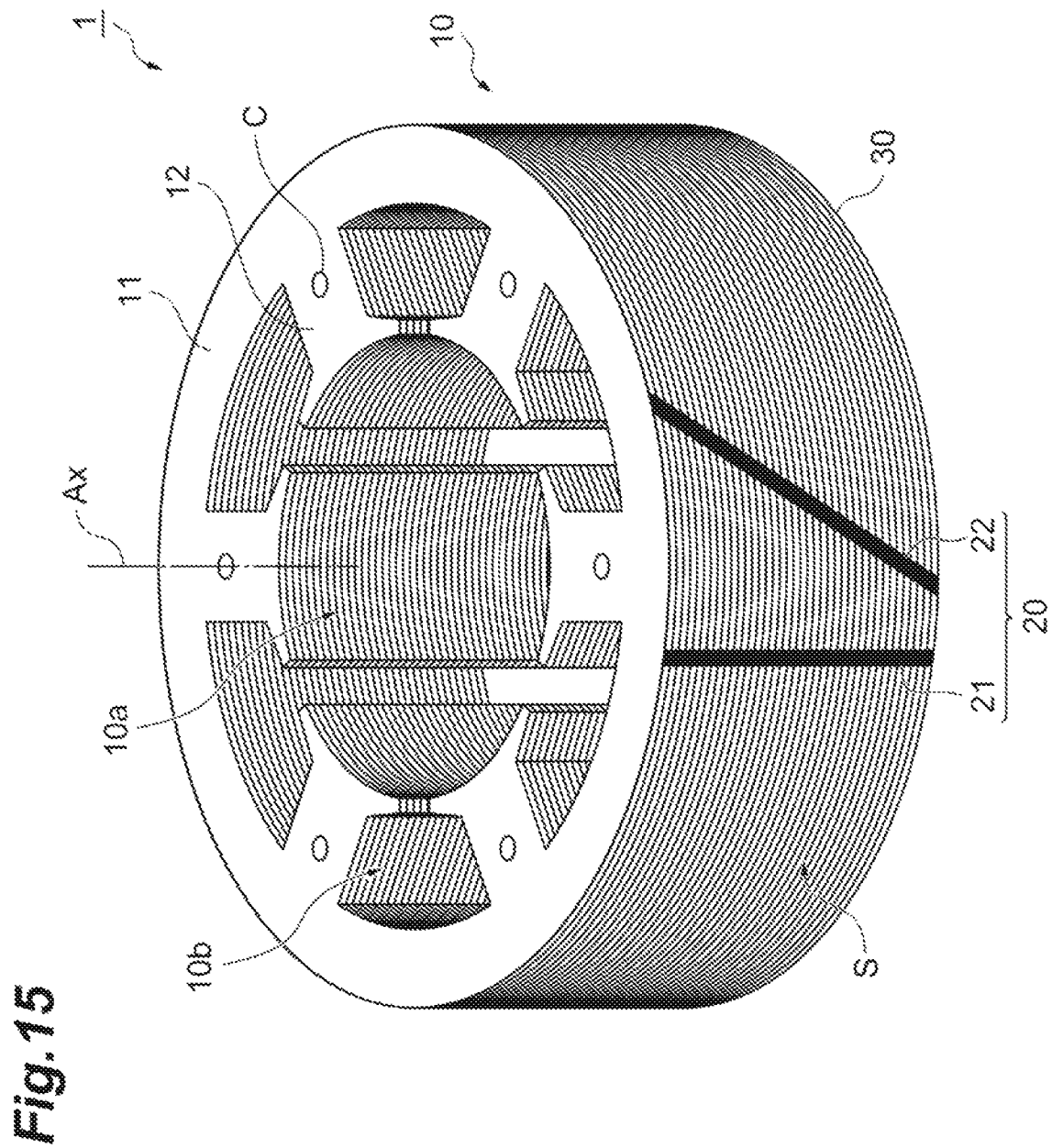
FIG. 15 is a perspective view illustrating another example of the laminated stator core.

As depicted in FIG. 15, the present invention may be applied not only to the laminate 10 in which a plurality of blocks B are laminated, but also to a laminate 10 in which a plurality of blanked members 30 that are not swaged together are laminated. In this case also, the distinguishing mark 20 is formed with a marking that is placed on the peripheral surface S of the laminate 10 so as to be continuously positioned over all of the blanked members 30. These blanked members 30 are not fastened to each other, and are thus in a state of being able to be freely moved or removed. Thus, after the distinguishing mark 20 has been placed, an integrating process by welding or an integrating process with resin, fir example, is performed on the laminate 10.

At steps S2 and S9 described above, whether the lamination height of the laminate 10 is within the appropriate range is determined. However, the quality of the laminate 10 may be determined based on a measure other than the lamination height. For example, when the laminate 10 is formed by rotational stack, whether the rotational stack has been performed appropriately may be determined. When the laminate 10 has a depression such as a counter bore, whether the lamination order of blocks B is appropriate for the depression to be formed may be determined. These measures for determining the quality may be used in combination.

The distinguishing mark 20 formed on the peripheral surface S of the laminate 10 at step S3 and the distinguishing mark 20 formed on the peripheral surface S of the laminate 10 at step S10 may be different in shape. The distinguishing mark 20 obtained at step S3 indicates that the laminate 10 has a lamination height that is appropriate without adjustment of the lamination height. In contrast, the distinguishing mark 20 obtained at step S10 indicates that the laminate 10 has a lamination height that has become appropriate because of adjustment of the lamination height. Thus, by making the shape of the distinguishing mark 20 obtained at step S3 different from that of the distinguishing mark obtained at step S10, whether the laminate 10 has a lamination height that has been adjusted can be identified based on the difference in shape between the distinguishing marks 20.

Figure 16:
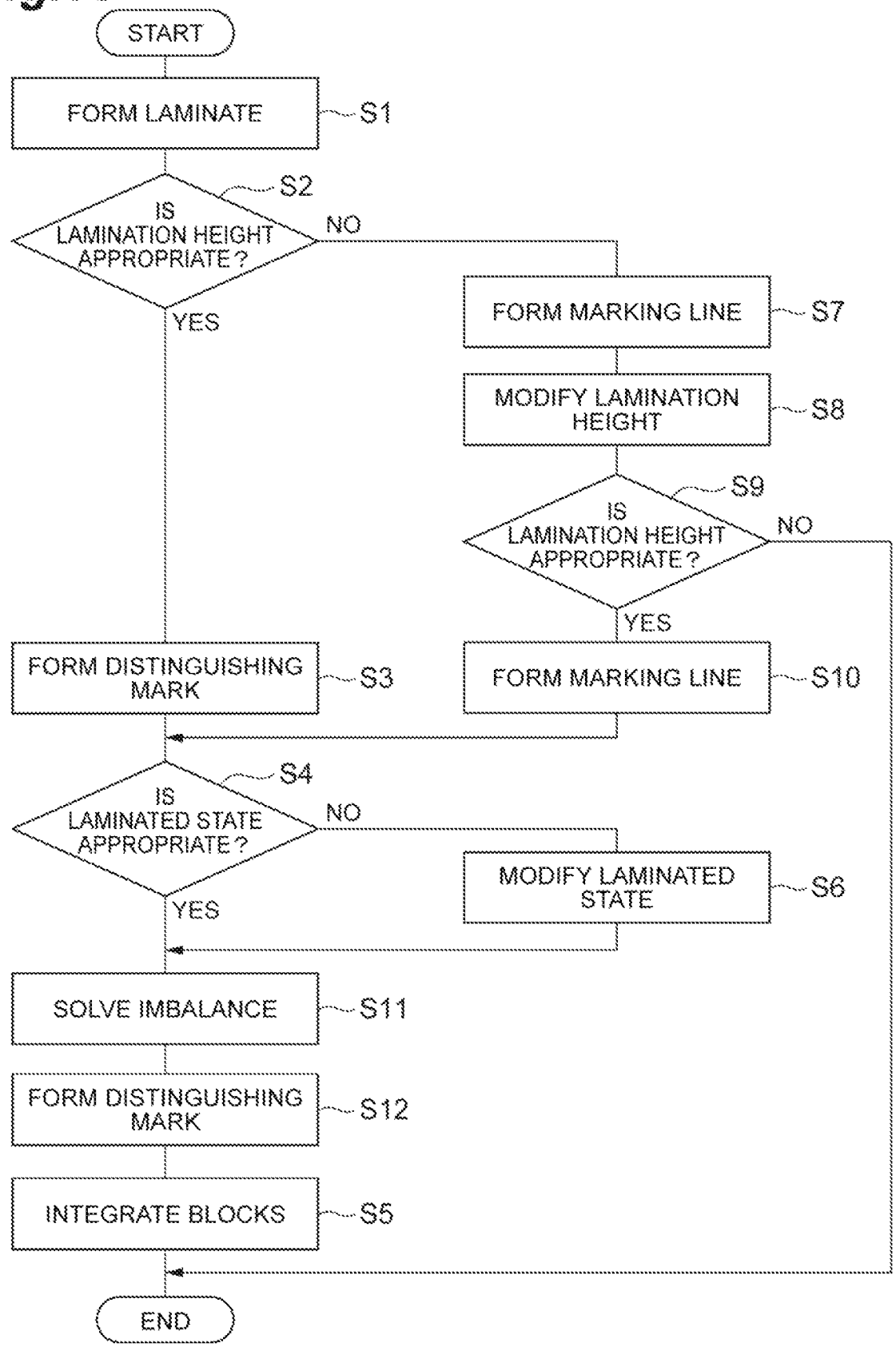
FIG. 16 is a flowchart for explaining another example of the method for manufacturing the laminated core.
Figure 17A:
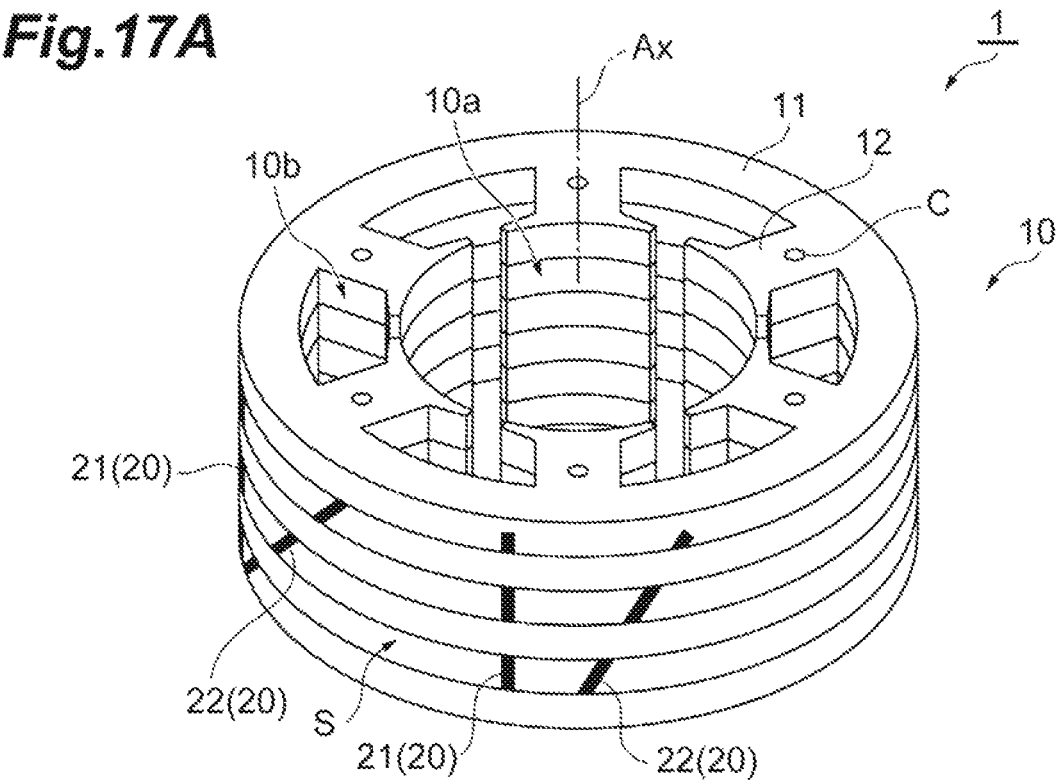
FIG. 17A and FIG. 17B are diagrams for explaining a process of placing the distinguishing mark on the laminated core.
Figure 17B:
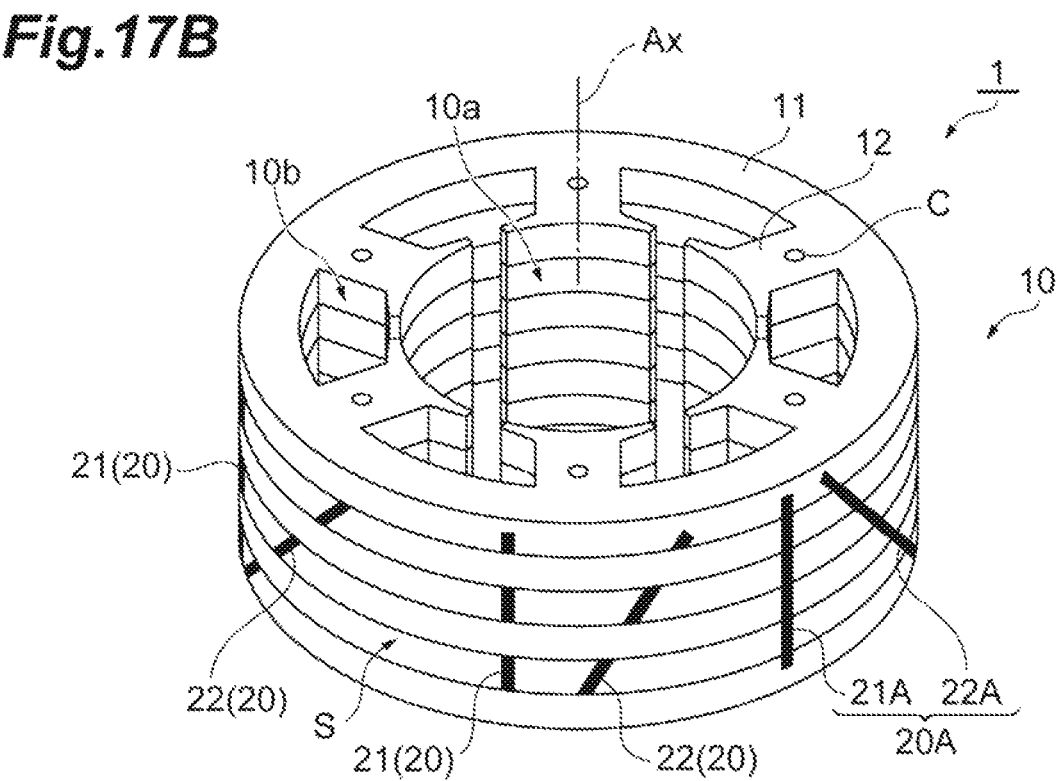

If another process has been performed during a period after steps S4 and S6 and before step S5, whereby the shape of the distinguishing mark 20 has deformed from the original shape, another distinguishing mark may be formed on the peripheral surface S of the laminate 10. In the example depicted in FIG. 16, after steps S4 and S6, a process of solving imbalance of the laminate 10 is performed (step S11 in FIG. 16). Specifically, some of the blocks B are rotated, whereby deviation in the center of gravity of the laminate 10 is reduced. Consequently, the shape of the distinguishing mark 20 formed at step S3 or step S10 has deformed from the original shape as depicted in FIG. 17A. Thus, after step S11, another distinguishing mark 20A including marking lines 21A and 22A is formed on the peripheral surface S of the laminate 10 (ninth step; see step S12 in FIG. 16). In this case, the distinguishing mark 20A may be formed in a position different from that of the distinguishing mark 20 (see FIG. 17B), or may be formed so as to complement the distinguishing mark 20 for the distinguishing mark 20 to have the original shape.

By this process at step S11, the new distinguishing mark 20A is placed on the peripheral surface of the laminate 10, so that rotational displacement can be easily found based on the new distinguishing mark 20A, and the rotational displacement of the laminate 10 can be solved by displacing the blocks B such that the shape of the new distinguishing mark 20A becomes the original shape. Consequently, the rotational displacement of the laminate 10 can be prevented.

Indeed, the novel devices and methods described herein may be embodied in a variety of other forms; furthermore, various omissions, substitutions and changes in the form of the devices and methods described herein may be made without departing from the spirit of the inventions. The accompanying claims and their equivalents are intended to cover such forms or modification as would fall within the scope and spirit of the inventions.

Certain aspects, advantages, and novel features of the embodiment have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

What is claimed is:

1. A laminated core comprising:
    a laminate in which $1^{st}$ to $(N+1)^{th}$ (N is a natural number of two or more) core members are laminated in this order; and
    a distinguishing mark formed with a marking that is placed on a peripheral surface of the laminate so as to be continuously positioned over all of the $1^{st}$ to $N^{th}$ core members from the $1^{st}$ core member which provides an upper end surface of the laminate to the $(N+1)^{th}$ core member which provides a lower end surface of the laminate in a height direction of the laminate,
    wherein the marking has a marking line including at least two or more portions extending continuously in a laminating direction of the $1^{st}$ to $(N+1)^{th}$ core members, and
    wherein the marking line has two different intersections $Pn_1$ and $Pn_2$ at a boundary between the $n^{th}$ (n is a natural number of 1 to N) core member among the $1^{st}$ to $(N+1)^{th}$ core members and the $(n+1)^{th}$ core member among the $1^{st}$ to $(N+1)^{th}$ core members, and satisfies, for all n, formula 1:

$$Ln \neq Lm \qquad (1)$$

where Ln is a separation distance between intersections $Pn_1$ and $Pn_2$; and m is any natural number of 1 to N except n.

2. The laminated core according to claim 1, wherein the marking line are asymmetrical with respect to an imaginary line extending through the center of the laminate in the laminating direction when viewed from the peripheral surface.

3. The laminated core according to claim 2, wherein the marking line have portions that are positioned closer to each other from the $1^{st}$ core member toward the $(N+1)^{th}$ core member.

4. The laminated core according to claim 1,
    wherein, on the peripheral surface of the laminate, an irregularly shaped portion having a projecting shape or a recessed shape is formed, and
    wherein the distinguishing mark is formed in a position corresponding to the irregularly shaped portion.

5. A method for manufacturing the laminated core according to claim 1, the method comprising:
    (a) laminating the $1^{st}$ to $(N+1)^{th}$ core members in this order to form the laminate; and
    (b) placing a marking on the peripheral surface of the laminate to form the distinguishing mark.

6. The method according to claim 5, further comprising (c) determining whether the distinguishing mark formed at step (b) has been deformed after step (b).

7. The method according to claim 6, further comprising (d) determining quality of the laminate after step (a) and before step (b), wherein
    when it has been determined at step (d) that the laminate is non-defective, the distinguishing mark is formed on the peripheral surface of the laminate at step (b).

8. The method according to claim 7, wherein
    at step (d), whether lamination height of the laminate is within a predetermined appropriate range is determined, and
    when it has been determined at step (d) that the lamination height is within the appropriate range, the distinguishing mark is formed on the peripheral surface of the laminate at step (b).

9. The method according to claim 8, wherein the distinguishing mark has first and second marking lines extending in the laminating direction of the $1^{st}$ to $(N+1)^{th}$ core members, the method further comprising:
    (e) placing a marking on the peripheral surface of the laminate to form the first marking line when it has been determined at step (d) that the lamination height exceeds the appropriate range;
    (f) adjusting the lamination height such that the lamination height is within the appropriate range after step (e);
    g) determining whether the lamination height adjusted at step (f) is within the appropriate range; and
    (h) placing a marking on the peripheral surface of the laminate to form the second marking line, thereby obtaining the distinguishing mark when it has been determined at step (g) that the lamination height is within the appropriate range.

10. The method according to claim 9, wherein the distinguishing mark obtained at step (b) and the distinguishing mark obtained at step (h) are different in shape.

11. The method according to claim 5, further comprising (i) placing a marking on the peripheral surface of the laminate to form another distinguishing mark that is different from the distinguishing mark after step (b).

* * * * *